United States Patent
Park et al.

(10) Patent No.: US 12,143,708 B2
(45) Date of Patent: Nov. 12, 2024

(54) METHOD AND DEVICE FOR PHOTOGRAPHY GUIDANCE OF FLEXIBLE DISPLAY

(71) Applicant: SAMSUNG ELECTRONICS CO., LTD., Suwon-si (KR)

(72) Inventors: Hyesun Park, Suwon-si (KR); Jonghyun Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/122,774

(22) Filed: Mar. 17, 2023

(65) Prior Publication Data
US 2023/0224573 A1    Jul. 13, 2023

Related U.S. Application Data

(63) Continuation of application No. PCT/KR2021/014209, filed on Oct. 14, 2021.

(30) Foreign Application Priority Data

Oct. 30, 2020 (KR) .................... 10-2020-0143707

(51) Int. Cl.
*H04N 23/63* (2023.01)
*G06F 1/16* (2006.01)
(Continued)

(52) U.S. Cl.
CPC ......... *H04N 23/632* (2023.01); *G06F 1/1652* (2013.01); *H04N 23/51* (2023.01);
(Continued)

(58) Field of Classification Search
CPC .... G06F 1/1624; G06F 1/1652; G06F 1/1677; G06F 1/1686; G06F 2203/04803;
(Continued)

(56) References Cited

U.S. PATENT DOCUMENTS 9,437,247 B2   9/2016  Pendergast et al.
10,225,477 B2   3/2019  Akita et al.
(Continued)

FOREIGN PATENT DOCUMENTS

JP    2006-101466    4/2006
JP       4314567     8/2009
(Continued)

OTHER PUBLICATIONS

International Search Report for PCT/KR2021/014209 mailed Jan. 20, 2022, 3 pages.
(Continued)

*Primary Examiner* — Amy R Hsu
(74) *Attorney, Agent, or Firm* — Nixon & Vanderhye, P.C.

(57) ABSTRACT

An example electronic device includes a first housing; a second housing; a camera module; a flexible display including a first area exposed at the front surface of an electronic device in a state in which the electronic device is closed, and a second area extended from the first area and exposed at the back surface of the electronic device; a memory; and a processor operatively connected to the camera module, the flexible display and the memory. The processor is configured to control to drive the camera module based on user input, display, in the first area and the second area, an image acquired from the camera module, provide first photography guidance information through the first area, and provide, through the second area, second photography guidance information that differs from the first photography guidance information.

20 Claims, 17 Drawing Sheets

(51) Int. Cl.
  *G06F 3/04886* (2022.01)
  *H04N 23/51* (2023.01)
  *H04N 23/60* (2023.01)
  *H04N 23/61* (2023.01)
  *H04N 23/617* (2023.01)

(52) U.S. Cl.
  CPC .......... *H04N 23/61* (2023.01); *H04N 23/617* (2023.01); *H04N 23/64* (2023.01); *G06F 3/04886* (2013.01); *G06F 2203/04803* (2013.01)

(58) Field of Classification Search
  CPC .. G06F 3/04883; G06F 3/04886; H04M 1/02; H04N 23/00; H04N 23/45; H04N 23/51; H04N 23/57; H04N 23/61; H04N 23/617; H04N 23/632; H04N 23/633; H04N 23/64; H04N 23/90
  See application file for complete search history.

(56) References Cited

U.S. PATENT DOCUMENTS

| | | | |
|---|---|---|---|
| 2006/0050151 | A1 | 3/2006 | Fujinawa |
| 2008/0074506 | A1 | 3/2008 | Oh et al. |
| 2010/0157128 | A1 | 6/2010 | Choi et al. |
| 2011/0128397 | A1 | 6/2011 | Kang |
| 2014/0063327 | A1 | 3/2014 | Kwon |
| 2014/0240454 | A1 | 8/2014 | Hirata et al. |
| 2014/0285476 | A1 | 9/2014 | Cho et al. |
| 2014/0368718 | A1* | 12/2014 | Matsutani .............. H04N 23/64 348/333.02 |
| 2015/0029304 | A1 | 1/2015 | Park |
| 2016/0085325 | A1 | 3/2016 | Lee et al. |
| 2020/0050416 | A1 | 2/2020 | Myung et al. |
| 2020/0264660 | A1* | 8/2020 | Song .................. G06F 1/1624 |
| 2020/0267247 | A1 | 8/2020 | Song et al. |
| 2022/0035407 | A1* | 2/2022 | Song ..................... G06F 1/1652 |
| 2022/0329687 | A1* | 10/2022 | Kim .................. H04M 1/72469 |
| 2022/0404870 | A1* | 12/2022 | Karri ..................... G06F 1/1654 |
| 2023/0038834 | A1* | 2/2023 | Kang .................... G06F 1/1652 |

FOREIGN PATENT DOCUMENTS

| | | |
|---|---|---|
| JP | 2010-081304 | 4/2010 |
| JP | 4536311 | 6/2010 |
| JP | 2018-137717 | 8/2018 |
| JP | 2020-182161 | 11/2020 |
| KR | 10-2007-0052477 | 5/2007 |
| KR | 10-2007-0097007 | 10/2007 |
| KR | 10-0800660 | 1/2008 |
| KR | 10-2010-0075158 | 7/2010 |
| KR | 10-2011-0060297 | 6/2011 |
| KR | 10-2014-0031690 | 3/2014 |
| KR | 10-2014-0115913 | 10/2014 |
| KR | 10-2016-0034660 | 3/2016 |
| KR | 10-1607283 | 3/2016 |
| KR | 10-1700357 | 1/2017 |
| KR | 10-2017-0015089 | 2/2017 |
| KR | 10-2017-0016248 | 2/2017 |
| KR | 10-2018-0037780 | 4/2018 |
| KR | 10-2021857 | 9/2019 |
| KR | 10-2081932 | 2/2020 |
| KR | 10-2020-0041133 | 4/2020 |
| KR | 10-2020-0099455 | 8/2020 |
| WO | 2013/069047 | 5/2013 |

OTHER PUBLICATIONS

Written Opinion for PCT/KR2021/014209 mailed Jan. 20, 2022, 4 pages.

Office Action dated Jul. 18, 2024 issued in corresponding Korean Patent Application No. 10-2020-0143707 and English-language translation.

* cited by examiner

[550]

[560]

[910]

[930]

METHOD AND DEVICE FOR PHOTOGRAPHY GUIDANCE OF FLEXIBLE DISPLAY

CROSS-REFERENCE TO RELATED APPLICATIONS

This application is a continuation of International Application No. PCT/KR2021/014209, designating the United States, filed on Oct. 14, 2021, in the Korean Intellectual Property Receiving Office and claiming priority to Korean Patent Application No. 10-2020-0143707, filed on Oct. 30, 2020 in the Korean Intellectual Property Office. The disclosures of each of these applications are incorporated by reference herein in their entireties.

BACKGROUND

Field

The disclosure relates to a method and a device for providing photographing guidance information in different directions through a flexible display.

Description of Related Art

With the development of digital technology, various types of electronic devices such as mobile communication terminals, personal digital assistants (PDAs), electronic notebooks, smartphones, tablet personal computers (PCs), and wearable devices are widely used. An electronic device may have a limited size for portability, and thus the size of a display is also limited. Accordingly, in recent years, various types of electronic devices that provide a more expanded screen in the electronic devices by multi-display have been developed.

For example, multiple displays are provided to provide an extended screen through multi-display. For another example, an electronic device is being designed to provide various services to users through a large screen, with a screen size gradually increasing in a display having a limited size.

A recent electronic device may have a new form factor such as a multi-display (e.g., dual display) device (e.g., a foldable device). The foldable device may be equipped with a foldable (or bendable) display (e.g., a foldable display or a flexible display) and may be used in a folded or unfolded state.

SUMMARY

Various example embodiments provide a method and a device for providing different types of photographing guidance information through a flexible display facing different directions when photographing using a camera.

According to various example embodiments, an electronic device may include a first housing, a second housing, a camera module (including, e.g., a camera), a flexible display including a first area exposed to a front surface of the electronic device in a closed state of the electronic device and a second area extending from the first area and exposed to a rear surface of the electronic device, a memory, and a processor operatively connected to the camera module, the flexible display, and the memory, wherein the processor is configured to control to drive the camera module based on a user input, display an image acquired from the camera module in the first area and the second area, and provide first photographing guidance information through the first area and provide second photographing guidance information different from the first photographing guidance information through the second area.

According to various example embodiments, a method for operating an electronic device including a flexible display, which includes a first area exposed to a front surface of the electronic device in a closed state of the electronic device and a second area extending from the first area and exposed to a rear surface of the electronic device, may include driving a camera module (including, e.g., a camera) of the electronic device based on a user input, displaying an image acquired from the camera module in the first area and the second area, providing first photographing guidance information through the first area, and providing second photographing guidance information different from the first photographing guidance information through the second area.

According to various embodiments, when photographing with a camera, first photographing guidance information for a photographer may be provided through a front display, and second photographing guidance information for a subject may be provided through a rear display, thereby providing various user experiences (UX) through an electronic device having a new form factor.

According to various embodiments, as the size of the rear display is changed, the second photographing guidance information provided through the rear display may be controlled to be different so as to provide more intuitive information to the user.

According to various embodiments, an area requiring photographing guidance may be determined through image analysis, and a distance to a subject or an attribute of the subject may be identified, thereby providing various types of photographing guidance information based on the guidance area, the distance, and/or the attribute.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
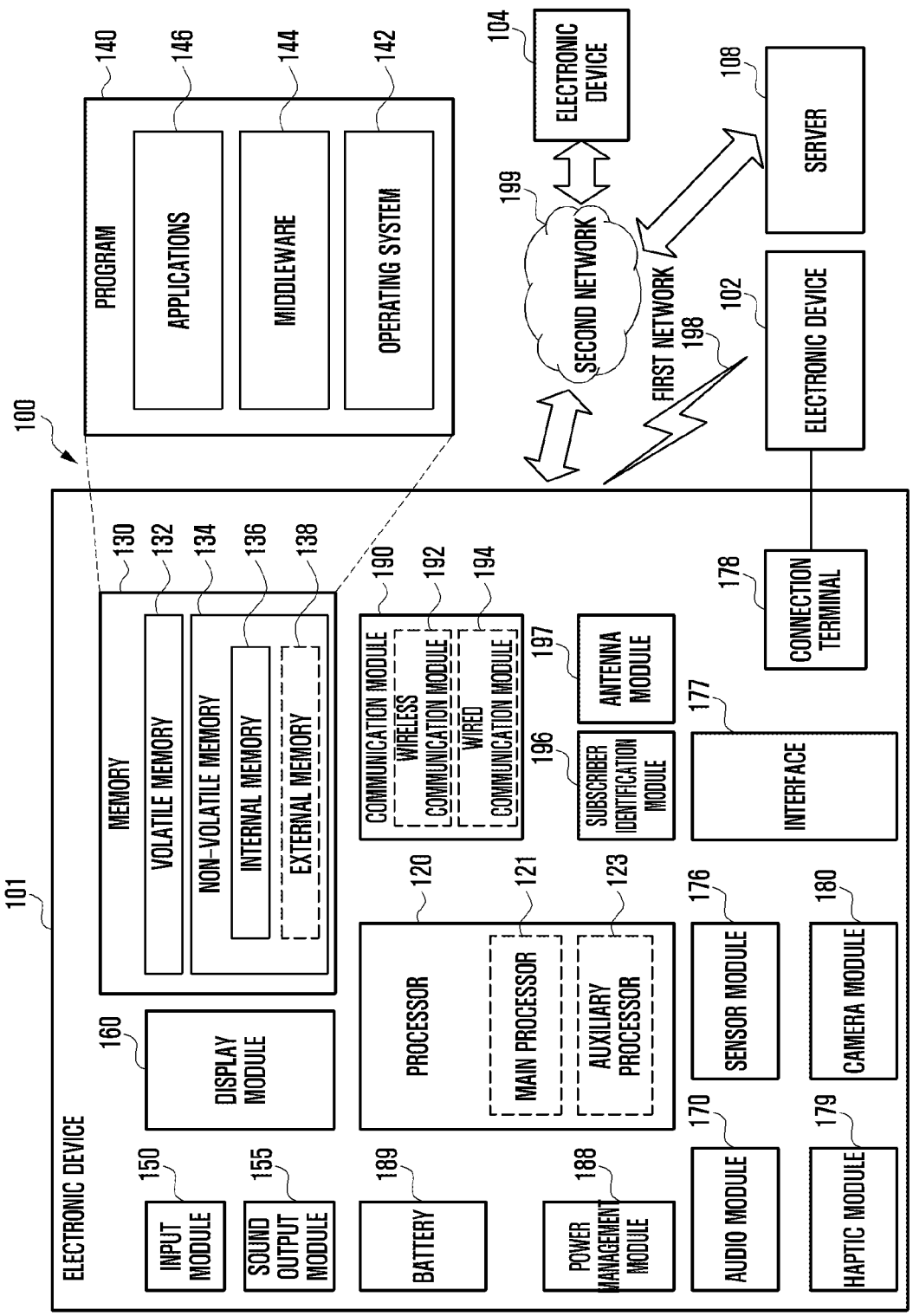
FIG. 1 is a block diagram of an example electronic device in a network environment according to various embodiments.

The electronic device according to certain embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added to the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers, for example, to a storage medium that is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
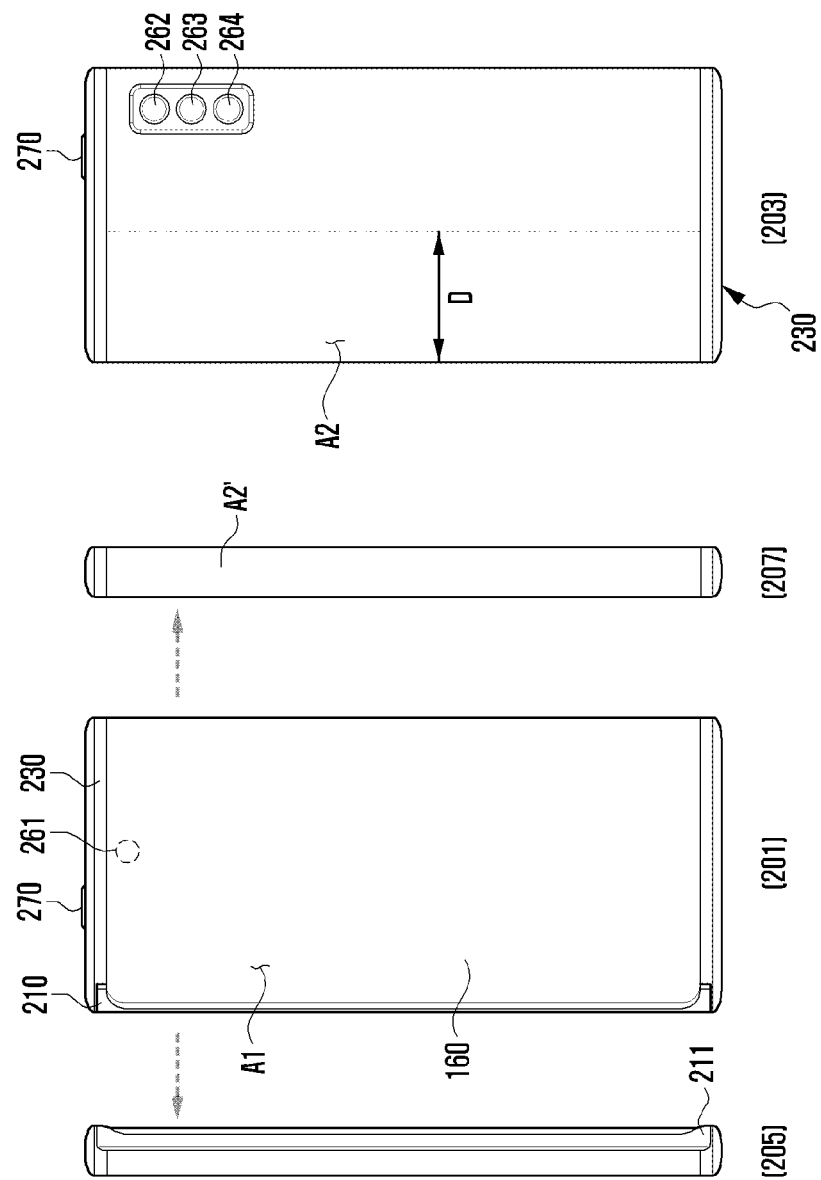
FIGS. 2A, 2B, and 2C is a diagram illustrating an example of a change in the state of an example electronic device according to various embodiments.
Figure 2B:
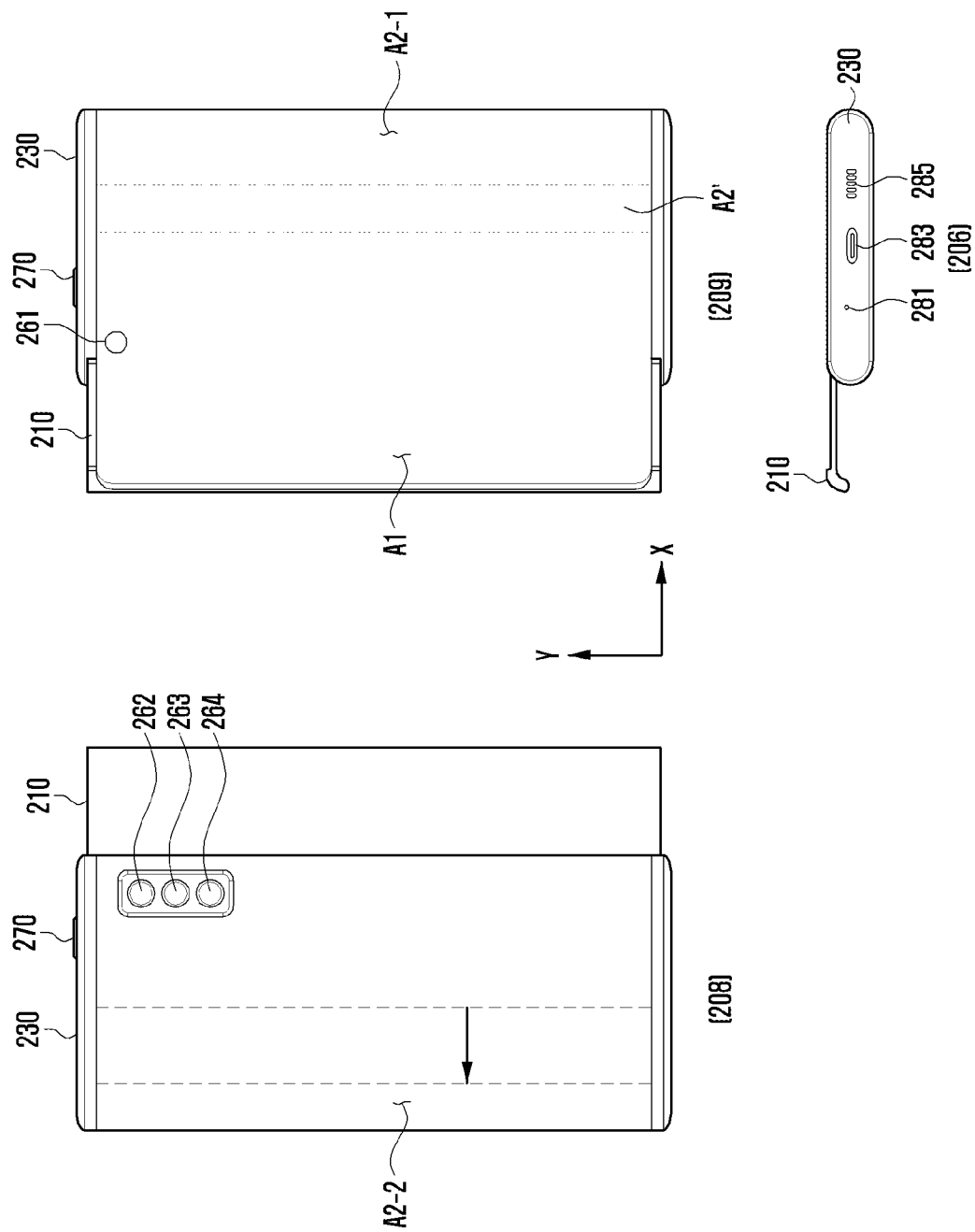
Figure 2C:
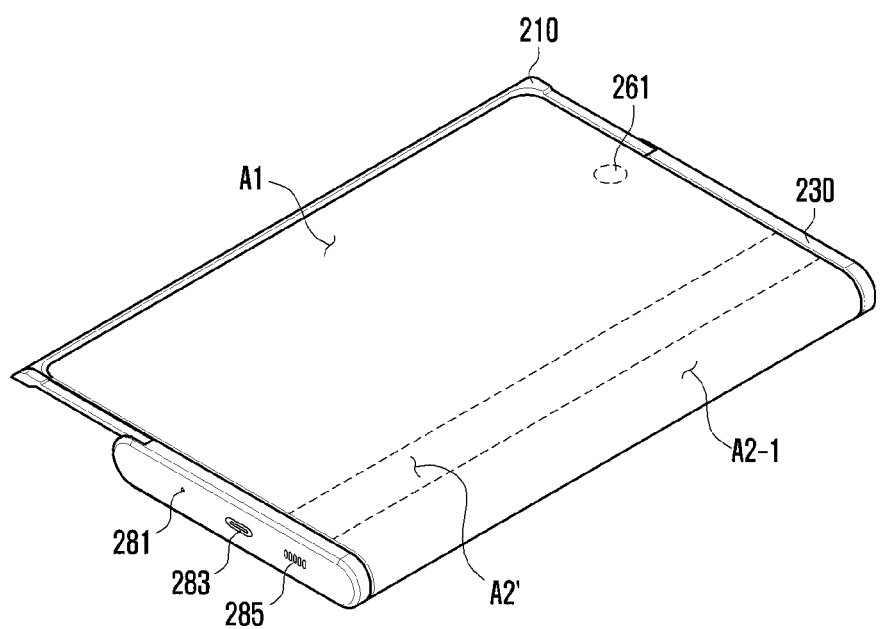

FIGS. 2A, 2B, and 2C are diagram illustrating an example of a change in state of an example electronic device according to various embodiments.

FIG. 2A is a diagram showing a front view 201 and a rear view 203 of the electronic device in a closed state.

Referring to FIG. 2A, an electronic device (e.g., the electronic device 101 in FIG. 1) according to various embodiments may be in a state (e.g., a closed state) in which a portion (e.g., a second area A2) of a flexible display (e.g., the display module 160 in FIG. 1) is accommodated in a second housing 230. The electronic device 101 may include a first housing 210 and the second housing 230, and the first housing 210 may be slidable from the second housing 230. The second housing 230 may be fixed, and the first housing 210 may be disposed to reciprocate a predetermined distance in a designated direction (e.g., the x-axis direction D) from the second housing 230. A sliding structure for sliding of the first housing 210 may be provided between the first housing 210 and the second housing 230. The sliding structure may include, for example, a guide rail and a slide or roller that is guided and moved by the guide rail. The sliding structure may be implemented in a variety of other ways.

The second housing 230 is a main housing of the electronic device 101, and may accommodate various electric and electronic components such as a main circuit board or a battery. The first housing 210 may include a flexible display (e.g., the display module 160 in FIG. 1). The display module 160 may include a first area A1 and a second area A2. The second area A2 may extend from the first area A1, and may be accommodated in the second housing 230 or exposed to the outside of the second housing 230 according to the movement (e.g., sliding) of the first housing 210. For this reason, the size of a display area exposed to the front or rear surface of the electronic device 101 may be different. For example, in a closed state of the electronic device 101, the first area A1 may face a first direction (e.g., a front surface), and the second area A2 may face a second direction (e.g., a rear surface). The second area A2 is a portion that is bendable according to a state change of the electronic device 101, and may be referred to by other terms such as a bendable area or a bendable section.

For example, depending on the movement (e.g., sliding) of the first housing 210 relative to the second housing 230, the second area A2 may be inserted into the second housing 230 (e.g., slide-in operation) or exposed to the outside of the second housing 230 (e.g., a slide-out operation). The second area A2 may include an area exposed through a side area A2' of the electronic device 101 and the rear surface of the electronic device 101 when the electronic device 101 is in a closed state. When the second housing 230 corresponding to the second area A2 is made of a transparent cover, the second area A2 may be exposed through the transparent cover while the electronic device 101 is in the closed state. The side area A2' may refer to a first side surface 207 extending from the first area A1 to the second area A2 of the display module 160. A plate 211 of the first housing 210 may be included in a second side surface 205 opposite to the first side surface 207, and a portion (e.g., the first area A1) of the display module 160 may be seated on one surface of the plate 211. The first side surface 207 and the second side surface 205 may refer to side surfaces corresponding to long lengths of two parallel side surfaces of the second housing 230.

A key input device 270 may be included in a third side surface (e.g., an upper side surface of the electronic device 101) corresponding to the short length of two parallel side surfaces of the second housing 230. A microphone 281, a connector hole 283, or a speaker 285 may be further included in a fourth side surface (e.g., the lower side surface of the electronic device 101) corresponding to the short length of the two parallel side surfaces of the second housing 230. See FIG. 2B. According to an embodiment, the key input device 270 may be included in the second side surface 205 or the fourth side surface of the second housing 230. Depending on appearance and usage conditions, the illustrated key input device 270 may be omitted, or the electronic device 101 may be designed to include additional key input device(s). In various embodiments, the electronic device 101 may include a key input device which is not illustrated, for example, a home key button or a touch pad disposed around the home key button. According to an embodiment, at least a part of the key input device 270 may be located in one area of the first housing 210.

A first camera module 261 (e.g., the camera module 180 in FIG. 1) may be included in the first housing 210 or the first area A1 of the display module 160. For example, the first camera module 261 may be positioned in the electronic device 101 while being aligned with an opening (e.g., a through-hole or a notch) formed in the first area A1. External light may be introduced into the first camera module 261 by passing through the opening and a partial area of the transparent cover overlapping the opening.

In the second housing 230, a portion corresponding to the second area A2 on the rear surface of the electronic device 101 may be formed as a transparent cover. The transparent cover may serve to protect the display module 160 from the outside, and may be implemented as a flexible member such as a plastic film (e.g., a polyimide film) or ultra-thin glass (UTG). When the electronic device 101 is in the closed state, the first area A1 of the display module 160 may be exposed through the front surface of the electronic device 101, and the second area A2 of the display 160 may be exposed through the rear surface of the electronic device 101. The second housing 230 may include multiple camera modules 262, 263, and 264 (e.g., the camera module 180 in FIG. 1) at the rear surface of the electronic device 101.

The first camera module 261 or the multiple camera modules 262, 263, and 264 may have different properties (e.g., fields of view) or functions, and may include, for example, a dual camera or a triple camera. In various embodiments, the multiple camera modules 262, 263, and 264 may include lenses having different fields of view, and the electronic device 101 may control to change a camera module in the electronic device 101 based on a user's selection. In an embodiment, the first camera module 261 or the multiple camera modules 262, 263, and 264 may include at least one of a wide-angle camera, a telephoto camera, a color camera, a monochrome camera, or an infrared (IR) camera (e.g., time-of-flight camera and a structured light camera). The IR camera, for example, may operate as at least a portion of a sensor module (not shown) (e.g., the sensor module 176 in FIG. 1).

According to various embodiments, the electronic device 101 may use the first camera module 261 or the multiple camera modules 262, 263, and 264 to photograph a subject and acquire an image. The acquired image may be displayed as a preview image on the display module 160. When photographing, the electronic device 101 may display first photographing guidance information in the first area A1 exposed through the front surface thereof, and may display second photographing guidance information in the second area A2 exposed through the rear surface thereof.

FIG. 2B is a diagram illustrating a front view 209 and a rear view 208 of the electronic device in an opened state, and FIG. 2C is a diagram illustrating a perspective view of the electronic device in an opened state.

Referring to FIGS. 2B and 2C, the electronic device 101 may be in a state (e.g., opened state) in which the first housing 210 is moved from the second housing 230, and may be in a state in which the size of the display module 160 exposed to the front surface of the electronic device 101 may be increased. In an opened state of the electronic device 101, the display module 160 exposed to the front surface of the electronic device 101 may be the first area A1 and a portion of the second area A2. The second area A2 may include an area exposed through the first side surface 207 of the electronic device 101 and the rear surface of the electronic device 101. When the electronic device 101 is in the opened state, a portion (e.g., A2'+A2-1) of the second area A2 exposed through the front surface of the electronic device 101 may include a side area A2' corresponding to the first side surface 207 and a portion A2-1 of the second area A2. When the electronic device 101 is in the opened state, another portion A2-2 of the second area A2 may be exposed through the rear surface of the electronic device 101.

The opened state is a state in which the first housing 210 is maximally moved from the second housing 230, and may refer, for example, to a state in which the first housing 210 is maximally moved in a first direction (e.g., the −x axis direction). The opened state may refer, for example, to a fully opened state. An intermediate state may refer, for example, to a state between a closed state (e.g., see FIG. 2A) and an opened state (e.g., FIG. 2B). The intermediate state may refer, for example, to a state in which the first housing 210 can move further from the second housing 230. For example, a portion (e.g., A2'+A2-1') of the second area A2 exposed through the front surface of the electronic device 101 in the intermediate state may be smaller than a portion (e.g., A2'+A2-1) of the second area A2 exposed through the front surface of the electronic device 101 in the opened state. Another portion (e.g., A2-2') of the second area A2 exposed through the rear surface of the electronic device 101 in the intermediate state may be larger than the other portion (e.g., A2-2) of the second area A2 exposed through the rear surface of the electronic device 101 in the opened state. The intermediate state may further include multiple steps (e.g., steps not mentioned above). In the electronic device 101, the size of the display module 160 exposed through the front or rear surface of the electronic device 101 may be different according to the distances that the first housing 210 moves from the second housing 230.

In the drawing, it is described that the other part A2-2 of the second area A2 is exposed through the rear surface of the electronic device 101 in the opened state. However, in the opened state, the electronic device 101 may expose both the first area A1 and the second area A2 of the display module 160 through the front surface of the electronic device 101, and may not expose the display module 160 through the rear surface of the electronic device 101. This is only an implementation issue and the disclosure is not limited by this description.

A fourth side surface 206 corresponding to the short length of two parallel sides of the second housing 230 may further include a microphone 281, a connector hole 283, or a speaker 285.

An electronic device (e.g., the electronic device 101 in FIG. 1) according to various embodiments may include a first housing (e.g., the first housing 210 in FIGS. 2A, 2B, and 2C), a second housing (e.g., the second housing 230 in FIGS. 2A, 2B, and 2C), a camera module (e.g., the camera module 180 in FIG. 1), a flexible display (e.g., the display module 160 in FIG. 1) including a first area (e.g., the first area A1 in FIGS. 2A, 2B, and 2C) exposed to a front surface of the electronic device when the electronic device is in a closed state and a second area (e.g., the second area A2 in FIGS. 2A, 2B, and 2C) extending from the first area and exposed to a rear surface of the electronic device, a memory (e.g., the memory 130 in FIG. 1), and a processor (e.g., the processor 120 in FIG. 1) operatively connected to the camera module, the flexible display, and the memory, wherein the processor is configured to control to drive the camera module based on a user input, display an image acquired from the camera module in the first area and the second area, and provide first photographing guidance information through the first area and provide second photographing guidance information different from the first photographing guidance information through the second area.

The processor may be configured to analyze the acquired image to generate the first photographing guidance information for guiding a photographer, and to generate the second photographing guidance information for guiding a photographing target.

The processor may be configured to identify a display size of the second area exposed through the rear surface of the electronic device, identify a subject from the acquired image, and generate the second photographing guidance information based on the display size of the second area and the subject.

The processor may be configured to generate different types of the second photographing guidance information, based on the display size of the second area.

The processor may be configured to determine a photographing guidance area based on the acquired image, identify a subject from the acquired image, and generate the second photographing guidance information based on the photographing guidance area and an attribute of the subject.

The processor may be configured to change the photographing guidance area, based on a user input.

The processor may be configured to identify the display size of the second area exposed through the rear surface of the electronic device, and generate the second photographing guidance information based on the display size of the second area, the photographing guidance area, and the attribute of the subject.

The processor may be configured to identify a distance to a subject included in the acquired image, and generate the second photographing guidance information based on the distance to the subject and the subject.

The processor may be configured to determine a photographing guidance area including at least one subject when there is more than one subject included in the image, and generate the second photographing guidance information based on the photographing guidance area, the distance to the subject, and an attribute of the subject.

The processor may be configured to adjust, based on the distance to the subject, volume of audio provided as the second photographing guidance information.

The processor may be configured to configure, based on a user input, a partial area of the image displayed in the first area as an area to be displayed in the second area.

The processor may be configured to display a user interface, in which a suggested pose line is displayed in the acquired image, in the first area and the second area.

The second area may be configured to be exposed to the rear surface of the electronic device when accommodated in the second housing, and may be configured to be exposed out of the second housing according to movement of the first housing and exposed to the front or rear surface of the electronic device.

The flexible display may be configured such that a size of a display area exposed to the front or rear surface of the electronic device is different according to the movement of the first housing.

Figure 3:
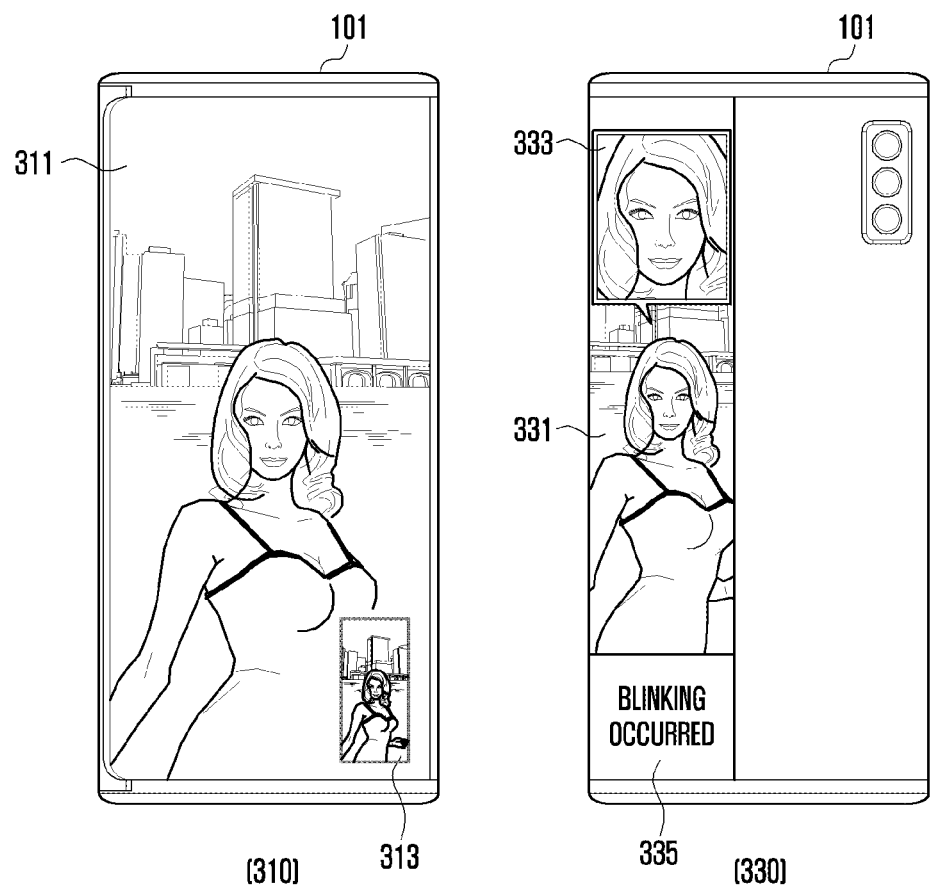
FIG. 3 is a diagram illustrating an example of providing different types of photographing guide information by an example electronic device according to various embodiments.

FIG. 3 is a diagram illustrating an example of providing different types of photographing guide information by an example electronic device according to various embodiments.

Referring to FIG. 3, an electronic device (e.g., the electronic device 101 in FIG. 1) according to various embodiments may acquire an image 311 from a camera module (e.g., the camera module 180 in FIG. 1, or the multiple camera modules 262, 263, and 264 in FIG. 2A) when photographing in a closed state (e.g., FIG. 2A). The image 311 may be displayed as a preview image on a flexible display (e.g., the display module 160 in FIG. 1). The electronic device 101 may display the image 311 in a first area (e.g., the first area A1 in FIG. 2A) of the display module 160, and may display an image 331 corresponding to the acquired image 311 in a second area (e.g., the second area A2 in FIG. 2A) of the display module 160. A first user interface 310 may include the image 311 displayed in the first area A1, which is the front surface of the electronic device 101 in the closed state, or an image 313 corresponding to the image 331 displayed in the second area A2. A second user interface 330 may include the image 331 displayed on the second area A2, which is the rear surface of the electronic device 101 in a closed state. The closed state may be a state (e.g., a closed state) in which a portion (e.g., the second area A2) of the display module 160 is accommodated in a second housing (e.g., the second housing 230 in FIG. 2A). The second housing 230 may include a transparent cover in a rear area of the electronic device 101 corresponding to the second area A2. Second photographing guidance information displayed in the second area A2 may be displayed through the transparent cover so that a user can identify the second photographing guidance information.

The image 311 displayed in the first area A1 may be identical to or different from the image 331 displayed in the second area A2. For example, the image 331 displayed in the second area A2 may include a partial image resulting from enlarging or reducing a portion of the image 311 or excluding a portion of the image 311. The electronic device 101 may display (e.g., superpose and display) the image 331 displayed in the second area A2 on a portion of the image 311 displayed in the first area A1 (e.g., overlapping display). The electronic device 101 may provide first photographing guidance information through the first area A1 and second photographing guidance information 333 and 335 through the second area A2.

The first photographing guidance information may be information for guiding a photographer during photographing, and the second photographing guidance information may be information for guiding a subject (e.g., a person). The photographer may, for example, be a user who presses a photographing button on the electronic device 101. The subject may, for example, be the object to be photographed by the photographer. The electronic device 101 may analyze various events related to photographing and provide various types of information necessary for photographing as the first photographing guidance information or the second photographing guidance information. The first photographing guidance information or the second photographing guidance information may include at least one of text, an image, audio, or video. The first photographing guidance information and the second photographing guidance information have different objects to be provided, and thus may include different types of information. For example, the second photographing guidance information may include an enlarged image 333 and text 335

According to various embodiments, the first photographing guidance information may include at least one of a field-of-view change notification (or induction), a lens cleaning notification, a shaking notification, a photographing mode change notification, a flash on/off notification, or a high-resolution photographing notification. For example, the electronic device 101 may acquire an image from at least one of the multiple camera modules 262, 263, and 264, analyze the acquired image, and provide the first photographing guidance information. When a subject is outside a screen, the electronic device 101 may induce a photographer to change the field of view or may guide the photographer to position the subject within the screen. Alternatively, when blurring is detected in an image, the electronic device 101 may instruct the photographer to check whether foreign matter is attached to a camera. Alternatively, when shaking is detected through a sensor module (e.g., the sensor module 176 in FIG. 1) or when blurring is detected in the image, the electronic device 101 may notify of whether shaking has occurred. Alternatively, when noise is detected in an image, the electronic device 101 may guide the photographer to change a photographing mode to another mode (e.g., a night mode). Alternatively, when a red-eye effect is detected in an image, the electronic device 101 may guide the photographer to turn off a flash. Alternatively, when it is determined that the photographing mode needs to be changed (e.g., a high-resolution environment), the electronic device 101 may guide the photographer to change the photographing mode to the high-resolution environment.

According to various embodiments, the electronic device 101 may perform image analysis to determine whether a subject is a person. When the subject is a person, the electronic device 101 may provide the second photographing guidance information based on whether the subject blinks, whether the subject stares at the screen, whether the subject is smiling, whether a pose or a photographing position is changed, and/or whether a surrounding environment or special photographing is performed. The electronic device 101 may guide the subject not to close the eyes thereof when the subject closes their eyes, may guide the subject to look at the camera when the pupils of the subject do not correspond to the field of view of the camera, or may guide the subject to smile when the subject does not smile. Alternatively, the electronic device 101 may suggest a pose or a photographing position (or angle) to the subject for better photographing in conjunction with an artificial intelligence (AI) server. Alternatively, the electronic device 101 may guide re-photographing when an element (e.g., a passerby or an object) that interferes with photographing is detected in the surrounding environment. Alternatively, when the photograph mode is a specific photographing mode such as jump shot or slow shot, the electronic device 101 may provide guidance (e.g., jump timing) corresponding to the specific photographing mode.

According to various embodiments, the electronic device 101 may control to provide different types of second photographing guidance information according to attributes (e.g., age of a person) of a subject. For example, the electronic device 101 may generate second photographing guidance information including text or an image when the subject is an adult, or may generate second photographing guidance information including an image or audio when the subject is a child. The electronic device 101 may not provide the second photographing guidance information when the subject is not a person (e.g., an animal or an object). Alternatively, when the subject is not a person, the electronic device 101 may output audio data as the second photographing guidance information according to a user's selection.

Figure 4:
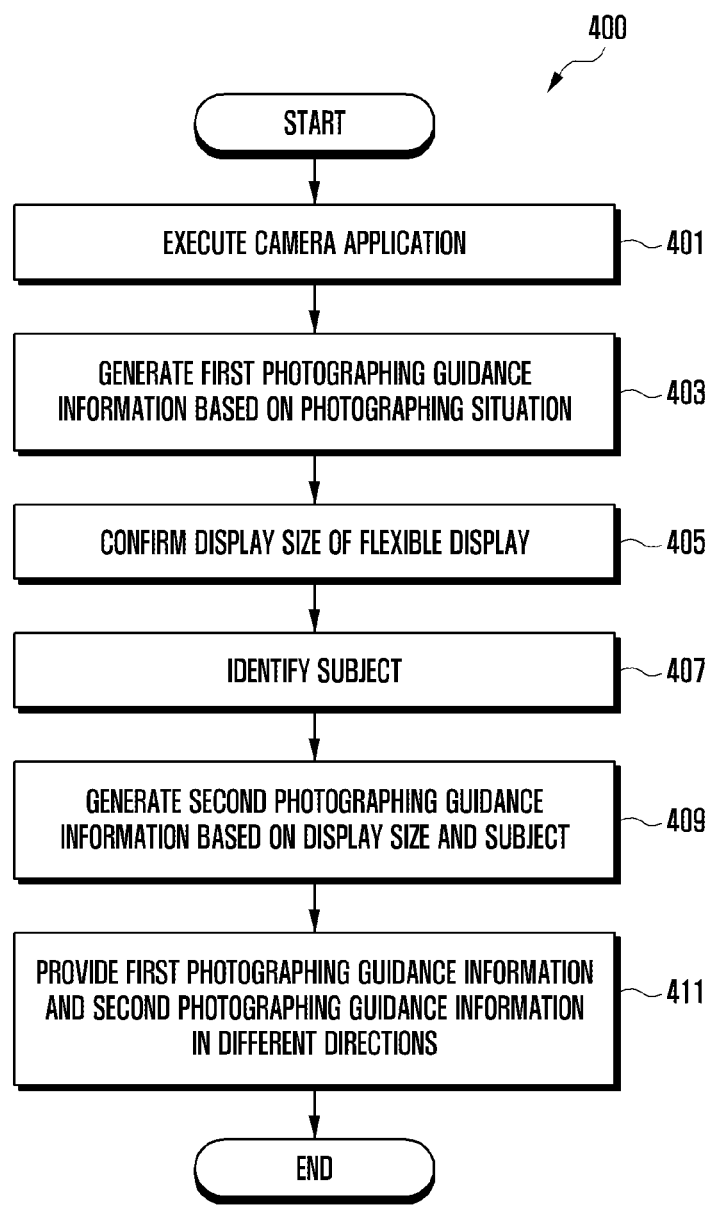
FIG. 4 is a flowchart illustrating a method of operating an example electronic device according to various embodiments.

FIG. 4 is a flowchart 400 illustrating an example method of operating an example electronic device according to various embodiments.

Referring to FIG. 4, in operation 401, a processor (e.g., the processor 120 in FIG. 1) of an electronic device (e.g., the electronic device 101 in FIG. 1) according to various embodiments may execute a camera application. The processor 120 may execute a camera application, based on a user input selecting an icon or button corresponding to the camera application. The processor 120 may acquire an image by driving a camera module (e.g., the camera module 180 in FIG. 1, or the multiple camera modules 262, 263, and 264 in FIG. 2A) based on the execution of the camera application. The acquired image may be displayed as a preview image on a flexible display (e.g., the display module 160 in FIG. 1).

In operation 403, the processor 120 may generate first photographing guidance information based on a photographing situation. The first photographing guidance information may be information for guiding a photographer when photographing. The photographing situation may refer, for example, to occurrence of a photographing event based on image analysis, object recognition, a surrounding environment, a photographing mode, or a distance to a subject. The processor 120 may cause a photographing event to occur when a photographing situation is a situation in which a photographer requires guidance. The processor 120 may generate first photographing guide information in response to the photographing event. For example, when a subject is outside the screen, the processor 120 may generate first photographing guidance information for inducing the photographer to change the field of view or guiding the photographer to position the subject within the screen.

Alternatively, when blurring is detected in the image, the processor 120 may generate first photographing guidance information for guiding the photographer to identify whether foreign matter is attached to a camera. Alternatively, in case that shaking is detected through a sensor module (e.g., the sensor module 176 in FIG. 1) when the blurring is detected, the processor 120 may generate first photographing guidance information for notifying that shaking has occurred during photographing. When noise is detected in the image through image analysis, the processor 120 may generate first photographing guidance information that guides the photographer to change a photographing mode to another mode (e.g., a night mode). When a red-eye effect is detected in the image, the processor 120 may generate first photographing guidance information for guiding to turn off a flash. When it is determined that the photographing mode needs to be changed (e.g., a high-resolution environment), the processor 120 may generate first photographing guidance information for guiding a change to a high-resolution environment.

In operation 405, the processor 120 may identify the display size of a flexible display (e.g., the display module 160 in FIG. 1). The display module 160 may include a first area (e.g., the first area A1 in FIG. 2A), which is the front surface of the electronic device 101 in a closed state (e.g., FIG. 2A) of the electronic device 101, and a second area (e.g., the second area A2 in FIG. 2A), which is the rear surface of the electronic device. In an opened state (e.g., FIGS. 2B and 2C) of the electronic device 101, the size of the display module 160 exposed to the front surface of the electronic device 101 may be increased. For example, the display module 160 exposed to the front surface of the electronic device 101 may the first area A1 and a portion of the second area A2. The second area A2 may include an area exposed through a first side surface (e.g., the first side surface 207 in FIG. 2A) of the electronic device 101 and the rear surface of the electronic device 101.

When the electronic device 101 is in the opened state, a portion (e.g., A2'+A2-1) of the second area A2 exposed through the front surface of the electronic device 101 is a side area A2' corresponding to the first side surface 207 and a portion A2-1 of the second area A2. When the electronic device 101 is in the opened state, another portion A2-2 of the second area A2 may be exposed through the rear surface of the electronic device 101. The processor 120 may identify the size of the second area A2 exposed through the rear surface of the electronic device 101. The sizes of the second area A2 exposed through the rear surface of the electronic device 101 when the electronic device 101 is in a closed state, an intermediate state, or an opened state may be different from each other.

In operation 407, the processor 120 may identify a subject. The processor 120 may analyze the image acquired from the camera module 180 to identify a subject. The processor 120 may identify an attribute of the subject through the image analysis. For example, the attribute of the subject may include at least one of an adult, a child, an animal, or an object. When the attribute of the subject is a person, the processor 120 may determine, from the image, whether the subject blinks, whether the subject stares at a screen, whether the subject smiles, whether a pose or a photographing position is changed, or whether the surrounding environment is changed.

Alternatively, the processor 120 may identify a photographing mode configured in the camera module 180 to determine whether the photographing mode is a special photographing mode.

In operation 409, the processor 120 may generate second photographing guidance information based on the display size and the subject. The processor 120 may control to provide different types of information according to the attribute of the subject. The processor 120 may provide different types of second photographing guidance information according to the age of the subject. For example, the processor 120 may provide second photographing guidance information when the age of the subject is greater than or equal to a predetermined age (e.g., 8 years old or 10 years old or an adult), but may not provide some types of second photographing guidance information when the age of the subject is less than the predetermined age (e.g., a child). When the age of the subject is less than the predetermined age, the processor 120 may not provide second photographing guidance information corresponding to, for example, eye blink warning, pose or photographing location change, surrounding environment or special photographing progress.

Alternatively, the processor 120 may generate second photographing guidance information including text or an image when the age of the subject is greater than or equal to the predetermined age, or may generate second photographing guidance information including an image or audio when the age of the subject is less than the predetermined age. When the subject is young, it may be difficult for the subject to understand second photographing guidance information even when the second photographing guidance information is provided. Therefore, the processor 120 may not provide some types of second photographing guidance information, or may provide the second photographing guidance information using audio or images capable of being visually expressed, rather than text The processor 120 may not provide the second photographing guidance information when the subject is not a person (e.g., an animal or an object). When the subject is not a person, the processor 120 may output audio data as the second photographing guide information according to a user's selection.

According to various embodiments, the processor 120 may control to provide different types of information according to the display size. For example, when the size of the second area A2 exposed through the rear surface of the electronic device 101 is a first size (e.g., the smallest size), the processor 120 may generate the second photographing guidance information as an icon-like image. When the size of the second area A2 exposed through the rear surface of the electronic device 101 is a second size (e.g., a medium size), the processor 120 may generate the second photographing guidance information as text. When the size of the second area A2 exposed through the rear surface of the electronic device 101 is a third size (e.g., the largest size), the processor 120 may generate the second photographing guidance information as the image acquired from the camera module 180. The processor 120 may generate second photographing guidance information including at least one of text, an image, audio, or video, based on the attribute of the subject and the display size.

In operation 411, the processor 120 may provide the first photographing guidance information and second photographing guidance information, e.g., in different directions. For example, the processor 120 may display the first photographing guidance information in the first area A1 of the display module 160, which is the front surface of the electronic device 101, and may display the second photographing guidance information in the second area A2 of the display module 160, which is the rear surface of the electronic device 101. When the electronic device 101 is in a closed state, the first area A1 may face an opposite direction to the second area A2. For example, the first area A1 may face a first direction (e.g., a forward direction), and the second area A2 may face a second direction (e.g., a backward direction). Even when the electronic device 101 is in an opened state, the size of the display module 160 displayed on the front and rear surfaces of the electronic device 101 may be changed, but the directions faced by the display module may be the same as in the closed state. When multiple microphones are included, the processor 120 may output audio corresponding to the first photographing guidance information through a first microphone facing the front side, and may output audio corresponding to the second photographing guidance information through a second microphone facing the rear side.

Figure 5A:
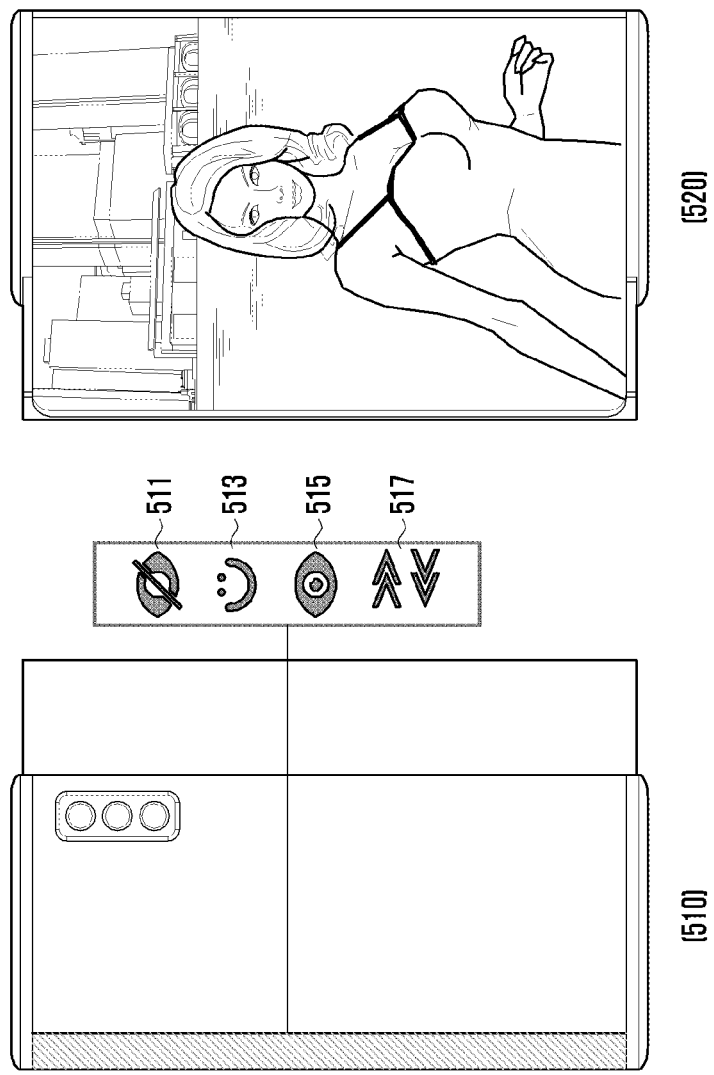
FIGS. 5A, 5B, and 5C are diagrams illustrating an example of providing different types of photographing guidance information depending on a display size of an electronic device according to various embodiments.
Figure 5B:
Figure 5B:
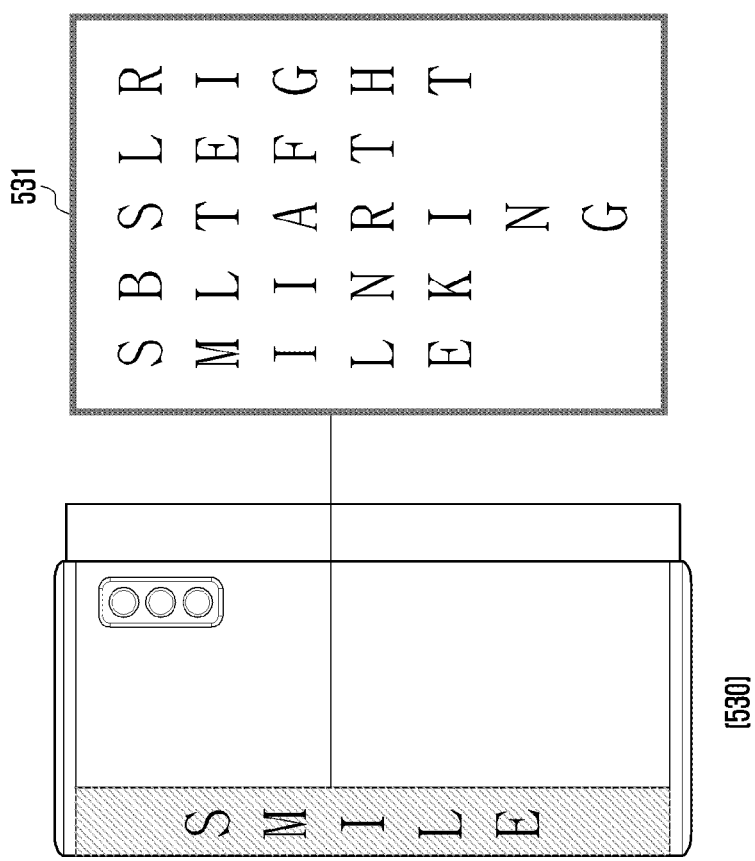
Figure 5C:
Figure 5C:
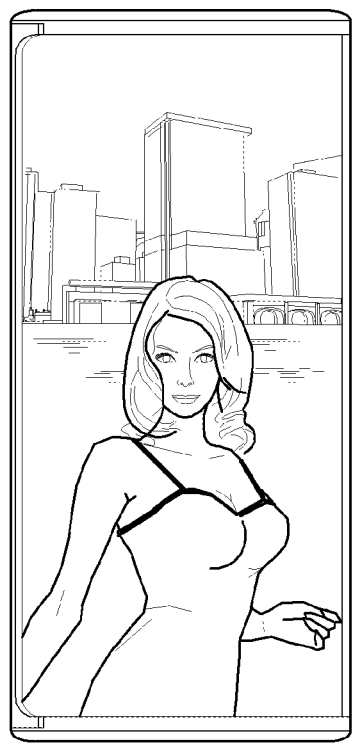

FIGS. 5A, 5B, and 5C are diagrams illustrating an example of providing different types of photographing guidance information depending on a display size of an example electronic device according to various embodiments.

FIG. 5A is a diagram illustrating an example of providing different types of photographing guidance information when an example electronic device according to various embodiments is in an opened state.

Referring to FIG. 5A, an electronic device (e.g., the electronic device 101 in FIG. 1) according to various embodiments may display a first user interface 510 and a second user interface 520 through a flexible display (e.g., the display module 160) when the electronic device 101 is in an opened state (e.g., FIG. 2B and FIG. 2C). The opened state may, for example, be a state in which the size of the display module 160 exposed to the front surface of the electronic device 101 is increased. When the electronic device 101 is in the opened state, the display module 160 exposed to the front surface of the electronic device 101 may be a first area (e.g., the first area A1 in FIG. 2B) and a portion of a second area (e.g., the second area A2 in FIG. 2B). The second area A2 may include an area exposed through the first side surface 207 of the electronic device 101 and the rear surface of the electronic device 101. When the electronic device 101 is in the opened state, a portion (e.g., A2'+A2-1) of the second area A2 exposed through the front surface of the electronic device 101 may include a side area A2' corresponding to the first side surface 207 and a portion A2-1 of the second area A2. When the electronic device 101 is in the opened state, another portion A2-2 of the second area A2 may be exposed through the rear surface of the electronic device 101.

The electronic device 101 may provide different types (e.g., text type, icon type, or image type) of information based on the display size exposed through the rear surface of the electronic device 101. The first user interface 510 may be displayed on another portion A2-2 of the second area A2 exposed through the rear surface of the electronic device 101, and may include second photographing guidance information. When the display size (e.g., the other part A2-2 of the second area A2) exposed through the rear surface of the electronic device 101 is a first size (e.g., the smallest size), the first user interface 510 may include an icon-like image as the second photographing guidance information. The electronic device 101 may use icons to intuitively notify a user corresponding to a subject of photographing in consideration of a small display size. The user may receive photographing guidance by the icon. A first icon 511 may, for example, be an icon instructing the user not to close his or her eyes, a second icon 513 may, for example, be an icon instructing the user to smile, a third icon 515 may, for example, be an icon instructing the user to stare at the camera, and a fourth icon 517 may, for example, be an icon instructing the user to move the position (e.g., left or right).

The second user interface 520 may include a display area (display size) including the first area A1, the side area A2' corresponding to the first side surface 207, and a portion A2-1 of the second area A2. The second user interface 520 may include first photographing guidance information.

FIG. 5B is a diagram illustrating an example in which an example electronic device according to various embodiments provides different types photographing guidance information in an intermediate state.

Referring to FIG. 5B, the electronic device 101 may display a third user interface 530 and a fourth user interface 540 through the display module 160 when the electronic device 101 is in an intermediate state. The intermediate state may refer, for example, to a state between a closed state (e.g., FIG. 2A) and an opened state (e.g., 2B). For example, a portion (e.g., A2'+A2-1') of the second area A2 exposed through the front surface of the electronic device 101 in the intermediate state may be smaller than a portion (e.g., A2'+A2-1) of the second area A2 exposed through the front surface of the electronic device 101 in the opened state. Another portion A2-2' of the second area A2 exposed through the rear surface of the electronic device 101 in the intermediate state may be larger than another portion A2-2 of the second area A2 exposed through the rear surface of the electronic device 101 in the opened state. In the electronic device 101, the size of the display module 160 exposed through the front or rear surface of the device 101 may be different according to a distance which the first housing (e.g., the first housing 210 in FIGS. 2A, 2B, and 2C) moves from the second housing (e.g., the second housing 230 in FIGS. 2A, 2B, and 2C).

The third user interface 530 may be displayed on another portion A2-2' of the second area A2 exposed through the rear surface of the electronic device 101, and may include second photographing guidance information. When the display size (e.g., another portion A2-2' of the second area A2) exposed through the rear surface of the electronic device 101 is a second size (e.g., a medium size), the third user interface 530 may include text 531 as the second photographing guidance information. The electronic device 101 may use text to intuitively notify a user corresponding to a subject of photographing in consideration of the display size. In an embodiment, the text 531 may scroll from SMILE to BLINK to STARING, etc. Although the drawing shows an example of providing text as the second photographing guidance information in an intermediate state, the electronic device 101 may provide icons and text as the second photographing guidance information in the intermediate state.

The fourth user interface 540 may include a display area (display size) including the first area A1, the side area A2' corresponding to the first side surface 207, and a portion A2-1' of the second area A2. The fourth user interface 540 may include first photographing guidance information.

FIG. 5C is a diagram illustrating an example of providing different types of photographing guidance information when an example electronic device according to various embodiments is in a closed state.

Referring to FIG. 5C, the electronic device 101 may display a fifth user interface 550 and a sixth user interface 560 through the display module 160 when the electronic device 101 is in a closed state (e.g., FIG. 2A). The closed state may refer, for example, to a state in which a portion (e.g., the second area A2) of the display module 160 is accommodated in the second housing 230. The second housing 230 may include a transparent cover in a rear area of the electronic device 101 corresponding to the second area A2. Second photographing guidance information displayed in the second area A2 may displayed through the transparent cover so that the user can identify the second photographing guidance information.

The fifth user interface 550 is displayed in the second area A2 exposed through the rear surface of the electronic device 101, and may include second photographing guidance information. When the display size (e.g., the second area A2) exposed through the rear surface of the electronic device 101 is a third size (e.g., the largest size), the fifth user interface 550 may include an image as the second photographing guidance information. Although the drawing shows an example of providing an image as the second photographing guidance information in a closed state, the electronic device 101 may provide text, an image, audio, or video as the second photographing guidance information in the closed state. The sixth user interface 560 may include a display area (display size) including the first area A1, and may include first photographing guidance information.

Figure 6:
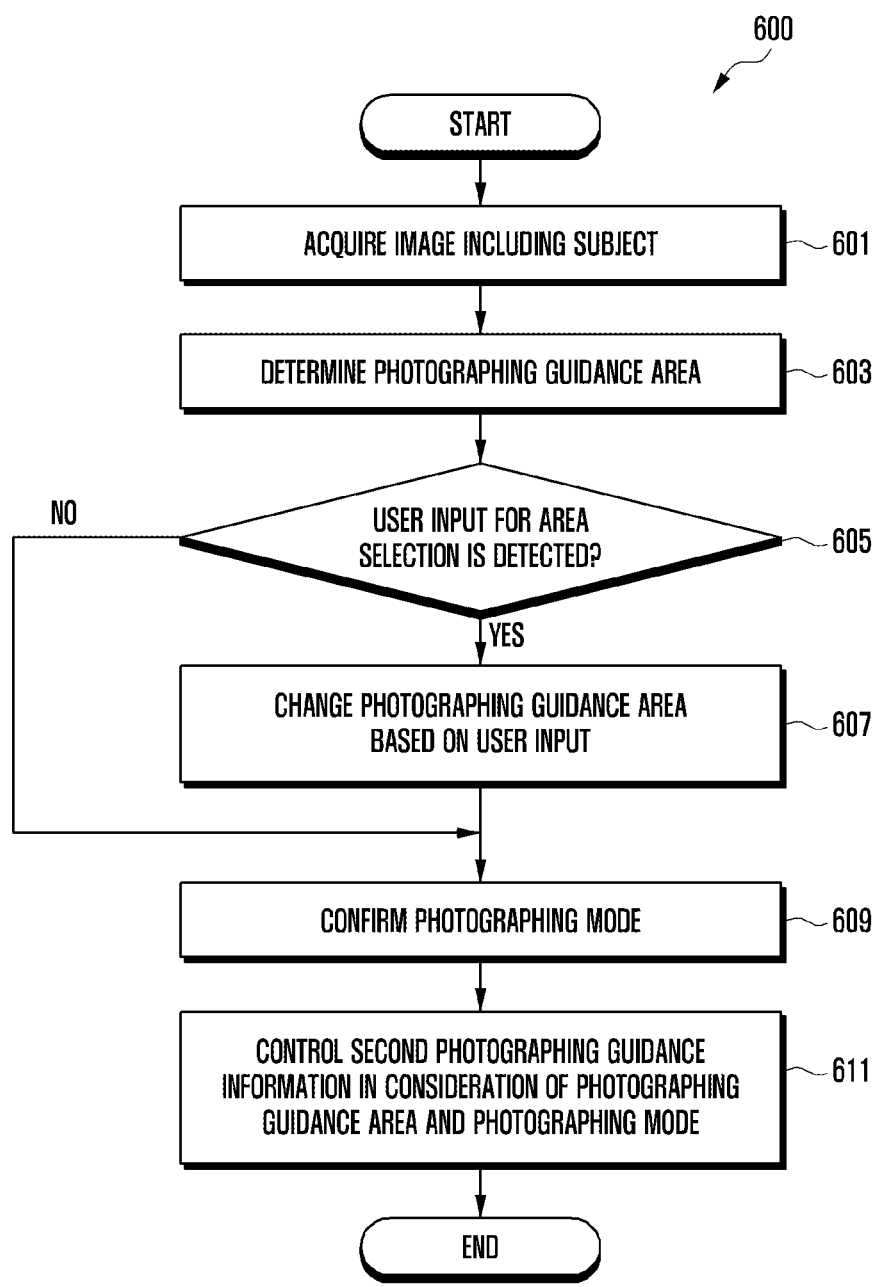
FIG. 6 is a flowchart illustrating a method of generating second photographing guidance information by an example electronic device according to various embodiments.

FIG. 6 is a flowchart 600 illustrating an example method of generating second photographing guidance information by an example electronic device according to various embodiments. The flowchart 600 in FIG. 6 may be performed while the flowchart 400 in FIG. 4 is performed or while operations 405, 407, and 409 in FIG. 4 are performed.

Referring to FIG. 6, in operation 601, a processor (e.g., the processor 120 in FIG. 1) of an electronic device (e.g., the electronic device 101 in FIG. 1) according to various embodiments may acquire an image including a subject. The image may be acquired from a camera module (e.g., the camera module 180 in FIG. 1 or the multiple camera modules 262, 263, and 264 in FIG. 2A) based on the execution of the camera application in FIG. 4. Operation 601 is for convenience of description below, and may be omitted when operation 601 is performed after operation 401.

In operation 603, the processor 120 may determine a photographing guidance area. The processor 120 may analyze the acquired image to determine a photographing guidance area. For example, the photographing guidance area is an area requiring photographing guidance, and may be an area around the eyes (e.g., a face area) when the subject closes the eyes thereof, or may be an area around the subject when a change in the environment around the subject is required. The processor 120 may automatically determine the photographing guidance area through image analysis.

In operation 605, the processor 120 may determine whether a user input for selecting the photographing guidance area is detected. The processor 120 may display the acquired image on a flexible display (e.g., the display module 160 in FIG. 1) exposed through the front surface of the electronic device 101. A user who is a photographer may directly select (or configure) an area requiring photographing guidance on the acquired image. The processor 120 may provide a user interface for selecting a photographing guidance area. For example, when the user selects any one point (or area) in the acquired image, a photographing guidance area including the selected point may be displayed. The photographing guidance area may include a location away from the selected point by a certain range (e.g., 1 cm or 2 cm). For example, the processor 120 may mark the photographing guidance area on the acquired image in a shape such as a circle or a rectangle. The processor 120 may perform operation 607 when the user input is detected, and perform operation 609 when the user input is not detected.

When the user input is detected, the processor 120 may change, based on the user input, the photographing guidance area in operation 607. The processor 120 may change, based on the user input, the photographing guidance area determined in operation 603. When the photographing guidance area is not determined in operation 603, the processor 120 may determine the photographing guidance area, based on the user input.

When the user input is not detected or after the photographing guidance area is changed, the processor 120 may identify or confirm a photographing mode in operation 609. The photographing mode corresponds to a photographing mode of a camera, and may include, for example, normal, video, selfie, rare selfie, live focus, slow motion, pro, panorama, or instant capture. The processor 120 may identify a photographing mode configured in the camera module 180. When the photographing mode configured in the camera module 180 corresponds to special photographing (e.g., slow motion or instant capture), the processor 120 may identify the photographing mode to generate photographing guidance information corresponding to the special photographing.

In operation 611, the processor 120 may control second photographing guidance information in consideration of the photographing guidance area and the photographing mode. The processor 120 may control the second photographing guidance information in more consideration of the photographing guidance area and the photographing mode together with attributes of the subject and the display size of the display module 160 exposed to the rear surface of the electronic device 101. For example, the processor 120 may generate text or audio corresponding to the photographing guidance area as the second photographing guidance information when the display size is a second size (e.g., a medium size), when the subject is an adult, when the photographing guidance area is configured, and when the photographing mode is a normal mode. Alternatively, the processor 120 may generate an image, which includes the photographing guidance area or results from enlarging or reducing the photographing guidance area, as the second photographing guidance information when the display size is a third size (e.g., the largest size), when the subject is an adult, when the photographing guidance area is configured, and when the photographing mode is a normal mode.

Figure 7:
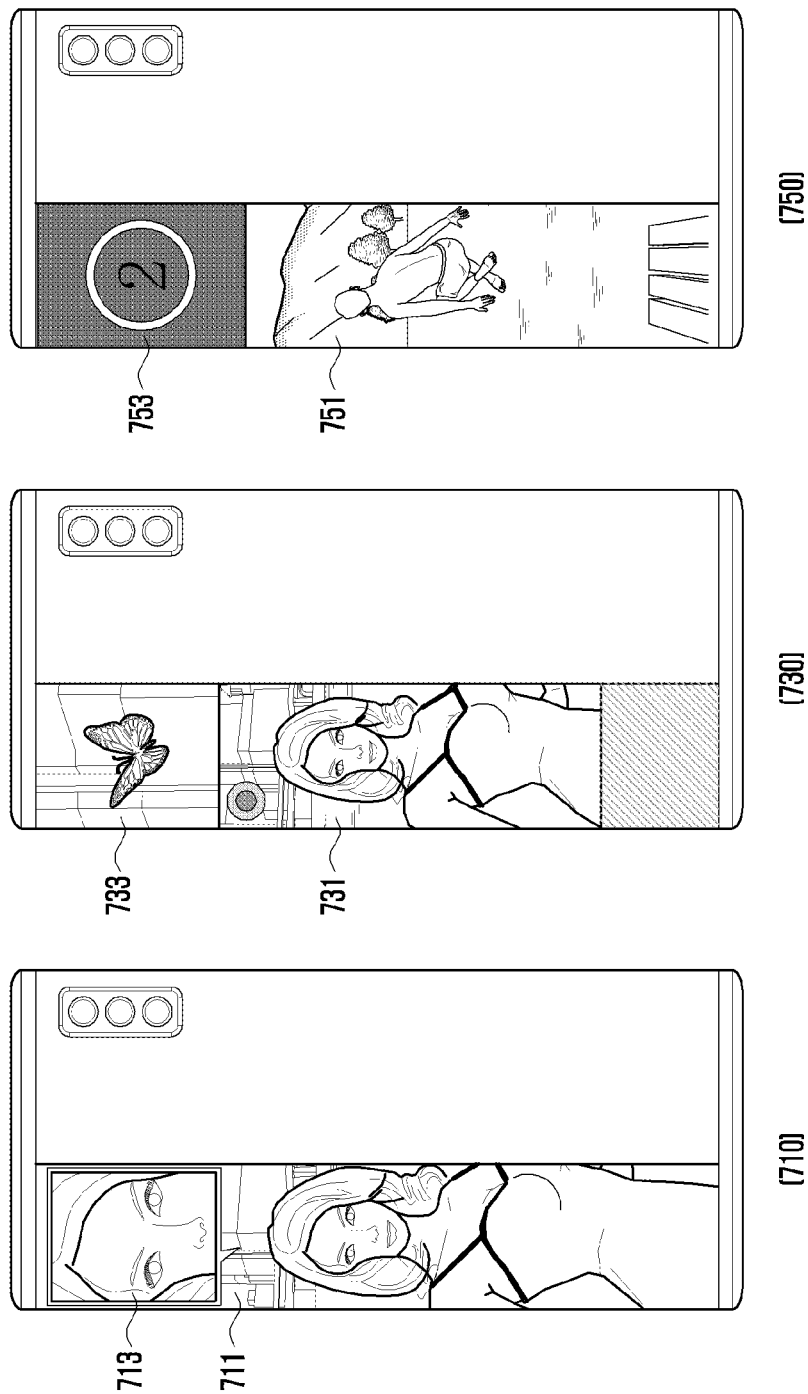
FIG. 7 is a diagram illustrating an example of providing various types of photographing guidance information by an example electronic device according to various embodiments.

FIG. 7 is a diagram illustrating an example of providing various types of photographing guidance information by an example electronic device according to various embodiments.

Referring to FIG. 7, a processor (e.g., the processor 120 in FIG. 1) of an electronic device (e.g., the electronic device 101 in FIG. 1) according to various embodiments may provide a first user interface 710, a second user interface 730, and a third user interface 750 including second photographing guidance information to a second area (e.g., the second area A2 in FIG. 2A) of a flexible display (e.g., the display module 160 in FIG. 1), which is the rear surface of the electronic device 101 in a closed state. The processor 120 may control (or generate) the second photographing guidance information, based on at least one among the display size of the display module 160 exposed to the rear surface of the electronic device 101, an attribute of a subject, the photographing guidance area, or a photographing mode.

The first user interface 710 may include a first image 711, acquired from a camera module (e.g., the camera module 180 in FIG. 1 or the multiple camera modules 262, 263, and 264 in FIG. 2A), and a first photographing guidance area 713. The first photographing guidance area 713 may be an enlarged area including the face when a subject closed the eyes thereof during photographing, when the subject's gaze is not aligned, or when the subject does not smile. A user who is the subject may intuitively identify the first photographing guidance area 713, and may be careful not to close his or her eyes.

A second user interface 730 may include a second image 731 acquired from the camera module 180, and a second photographing guidance area 733. The second photographing guidance area 733 may be obtained by enlarging an area that is analyzed as an element interfering with photographing in an environment around the subject through image analysis. The user, who is the subject, may intuitively identify the second photographing guidance area 733 and may wait until no object interfering with the camera is included. In the drawing, a butterfly is included in the second photographing guidance area 733, but, for example, in the case of photographing in a crowded place, a passerby may be included. Alternatively, when a pose of the subject or a photographing position needs to be changed, an area or information for guiding a photographing position may be provided as the second photographing guide information.

A third user interface 750 may include a third image 751 acquired from the camera module 180, and third photographing guidance information 753. The third photographing guidance information 753 may include information corresponding to special photographing when a photographing guidance area is not configured or corresponds to special photographing (e.g., slow motion or instant capture). For example, when the special photographing is a jump shot, the third photographing guidance information 753 may guide the user, who is the subject, to jump in consideration of a photographing time point.

Figure 8:
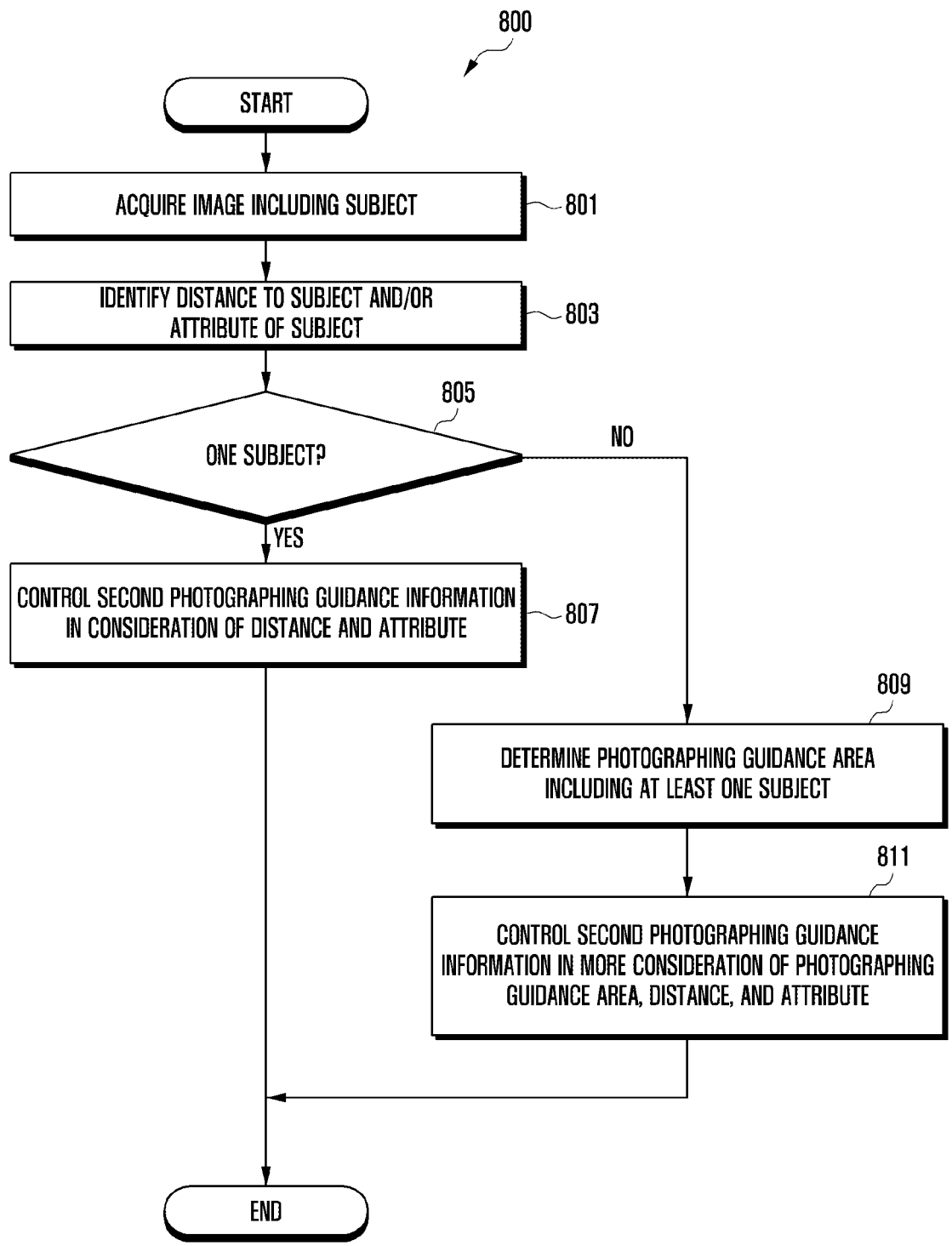
FIG. 8 is a flowchart illustrating an example method of generating second photographing guidance information by an example electronic device according to various embodiments.

FIG. 8 is a flowchart 800 illustrating an example method of generating second photographing guidance information by an example electronic device according to various embodiments. The flowchart 800 in FIG. 8 may be performed while the flowchart 400 in FIG. 4 is performed or while operations 405, 407, and 409 in FIG. 4 are performed.

Referring to FIG. 8, in operation 801, a processor (e.g., the processor 120 in FIG. 1) of an electronic device (e.g., the electronic device 101 in FIG. 1) according to various embodiments may acquire an image including a subject. The image may be acquired from a camera module (e.g., the camera module 180 in FIG. 1 or the multiple camera modules 262, 263, and 264 in FIG. 2A) based on the execution of the camera application in FIG. 4. Operation 801 is for convenience of description below, and may be omitted in a case that operation 801 is performed after operation 401.

In operation 803, the processor 120 may identify a distance to the subject and/or an attribute of the subject. The processor 120 may analyze the image to identify a distance between the electronic device 101 and the subject. The processor 120 may identify the distance between the electronic device 101 and the subject using a camera module 180 such as a depth camera or a sensor module (e.g., the sensor module 176 in FIG. 1). For example, the attribute of the subject may include at least one of an adult, a child, an animal, or an object. The processor 120 may perform operation 807 or operation 809 when the attribute of the subject is a person.

In operation 805, the processor 120 may determine whether there is only one subject included in the image. The processor 120 may perform face recognition from the image, and the processor 120 may perform operation 807 when one person is included, and may perform operation 809 when there is more than one person.

When one person is included, in operation 807, the processor 120 may control (or generate) second photographing guidance information in consideration of the distance to the subject and the attribute of the subject. The processor 120 may control the second photographing guidance information in consideration of the display size of the display module 160 exposed to the rear surface of the electronic device 101, the distance to the subject, and the attribute of the subject. The processor 120 may adjust audio output volume, based on the distance to the subject. For example, when the display size is a first size (e.g., the smallest size), when the subject is an adult, and when the distance to the subject is greater than a predetermined distance (e.g., 1 m), the processor 120 may generate an icon or audio (e.g., output at a volume of 7 out of 10) corresponding to the photographing guidance area as the second photographing guidance information. The processor 120 may perform voice conversion into audio corresponding to the photographing guidance information, and may provide the audio.

In an embodiment, the processor 120 may control the second photographing guidance information, based on at least one of a display size, a photographing guidance area, a photographing mode, a distance to a subject, or an attribute of the subject. For example, when the display size is a third size (e.g., the largest size), when the subject is an adult, when the photographing guidance area is configured, when the photographing mode is a special photographing mode, and when the distance to the subject is shorter than a determined distance (e.g., 1 m), the processor 120 may generate an image and audio (e.g., output at a volume of 3 out of 10), obtained by enlarging or reducing the photographing guidance area, as the second photographing guidance information.

When there is more than one person, in operation 809, the processor 120 may determine a photographing guidance area including at least one subject. When there are multiple subjects, the processor 120 may determine (or select) a subject requiring photographing guidance. When one of two subjects is not smiling, the processor 120 may determine a photographing guidance area including the subject that is not smiling. When one of the two subjects carries an object (e.g., a bag) that interferes with photographing, the processor 120 may determine a photographing guide area including the subject carrying the bag.

In operation 811, the processor 120 may control (generate) second photographing guidance information in consideration of the photographing guidance area, the distance, and the attribute. The processor 120 may control the second photographing guidance information, based on at least one of a display size, a photographing guidance area, a photographing mode, a distance to the subject, or an attribute of the subject. For example, when the display size is the third size (e.g., the largest size), when the subject is an adult, when the photographing guidance area is configured, when the photographing mode is a special photographing mode, and when the distance to the subject is shorter than a predetermined distance, the processor 120 may generate an audio and an image, obtained by enlarging the photographing guidance area, as the second photographing guidance information. In an embodiment, when the display size is the first size (e.g., a small size), when the subject is an adult, when the photographing guidance area is configured, when the photographing mode is a special photographing mode, and when the distance to the subject is greater than the predetermined distance, the processor 120 may generate an icon and audio corresponding to the photographing guidance area as the second photographing guidance information.

According to various embodiments, the processor 120 may recognize the face of a subject included in the photographing guidance area to identify who the subject is. For example, the processor 120 may compare the image with an image list stored in the electronic device 101 (e.g., images stored in a photo album) or images stored in contacts of the electronic device 101 to identify who the subject is. When the face of the subject is identical (or similar) to a face stored in the contacts, the processor 120 may use information (e.g., name) about the subject as the second photographing guide information. For example, when a subject's name is "Jack" and when the subject is not smiling, the processor 120 may provide text or audio of "Jack, say cheese ~~" as the second photographing guidance information. The processor 120 may generate at least one of text, image, audio, or video as the second photographing guidance information, based on the display size of the display module 160 exposed to the rear surface of the electronic device 101.

Figure 9A:
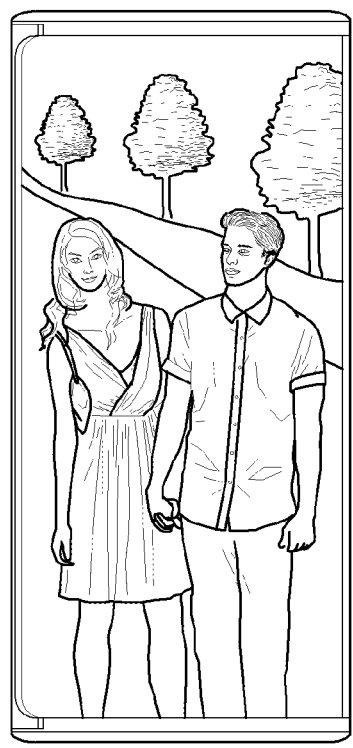
FIGS. 9A and 9B are diagrams illustrating various examples of providing photographing guidance information by an example electronic device according to various embodiments.
Figure 9A:
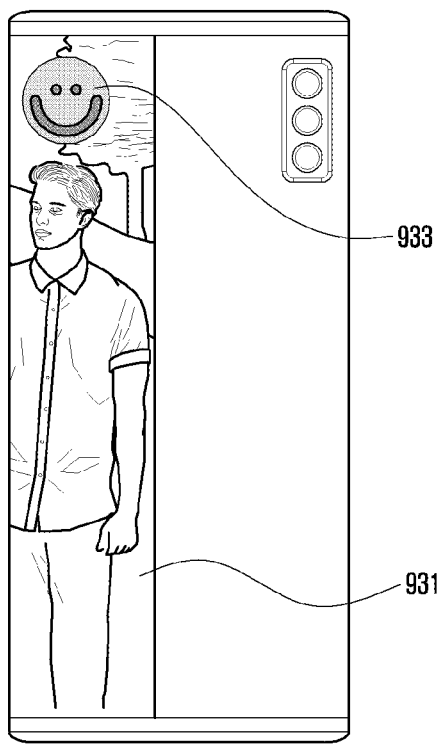
Figure 9B:
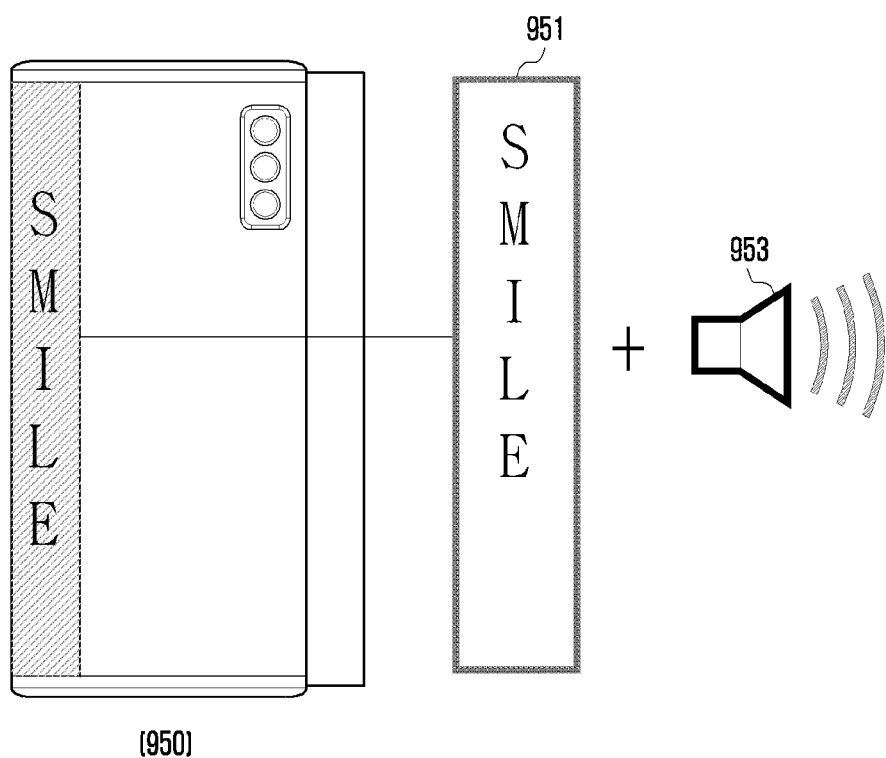

FIGS. 9A and 9B are diagrams illustrating various examples of providing photographing guidance information by an example electronic device according to various embodiments.

FIG. 9A illustrates an example of providing photographing guidance information by an electronic device according to various embodiments when there are multiple subjects.

Referring to FIG. 9A, a processor (e.g., the processor 120 in FIG. 1) of an electronic device (e.g., the electronic device 101 in FIG. 1) according to various embodiments may provide a first user interface 910 and a second user interface 930 through a flexible display (e.g., the display module 160 in FIG. 1) in a closed state. The first user interface 910 may be displayed in a first area (e.g., the first area A1 in FIG. 2A) of the display module 160, which is the front surface of the electronic device 101. The processor 120 may provide an image acquired from a camera module (e.g., the camera module 180 in FIG. 1 or the multiple camera modules 262, 263, and 264 in FIG. 2A) to the first user interface 910 in a preview form.

The second user interface 930 is displayed in a second area (e.g., the second area A2 in FIG. 2A) of the display module 160, which is the rear surface of the electronic device 101, and may include second photographing guidance information 933. The second user interface 930 may include a partial image 931 of the image acquired from the camera module 180 and second photographing guidance information 933. The processor 120 may analyze the acquired image, may identify a subject requiring photographing guidance when there are multiple subjects, and may configure a photographing guidance area including the identified subject. The partial image 931 may correspond to a photographing guidance area. The processor 120 may provide the second photographing guidance information 933 to a subject included in the photographing guidance area. The second photographing guidance information 933 may include a guidance message inducing the subject included in the photographing guidance area to smile. In the drawing, the second photographing guidance information 933 is displayed as an icon, but the processor 120 may provide the second photographing guidance information 933 by at least one of text, image, audio, or video according to a display size. The processor 120 may perform voice conversion into audio corresponding to the second photographing guidance information 933, and may output the audio.

FIG. 9B is a diagram illustrating an example of providing photographing guidance information based on a distance between a subject and an example electronic device according to various embodiments.

Referring to FIG. 9B, when the electronic device 101 is in a closed state, the processor 120 may provide a third user interface 950 including second photographing guidance information to the second area A2 of the display module 160, which is the rear surface of the electronic device 101. The second photographing guidance information may include text 951 and an audio 953. For example, when a distance to a subject is greater than a predetermined distance (e.g., 1m), the processor 120 may display the text 951 in the second area A2, and may output the audio 953 through a speaker (e.g., the sound output module 155). The processor 120 may adjust audio output volume, based on the distance to the subject. For example, when the distance to the subject is short, the processor 120 may output the audio 953 at a first volume (e.g., a level corresponding to a volume of 5 out of 10). When the distance to the subject is long, the processor 120 may output the audio 953 at a second volume (e.g., a level corresponding to a volume 10 out of 10). The processor 120 may perform voice conversion of the text 951 to audio corresponding to the text 951, and may provide the audio.

Figure 10A:
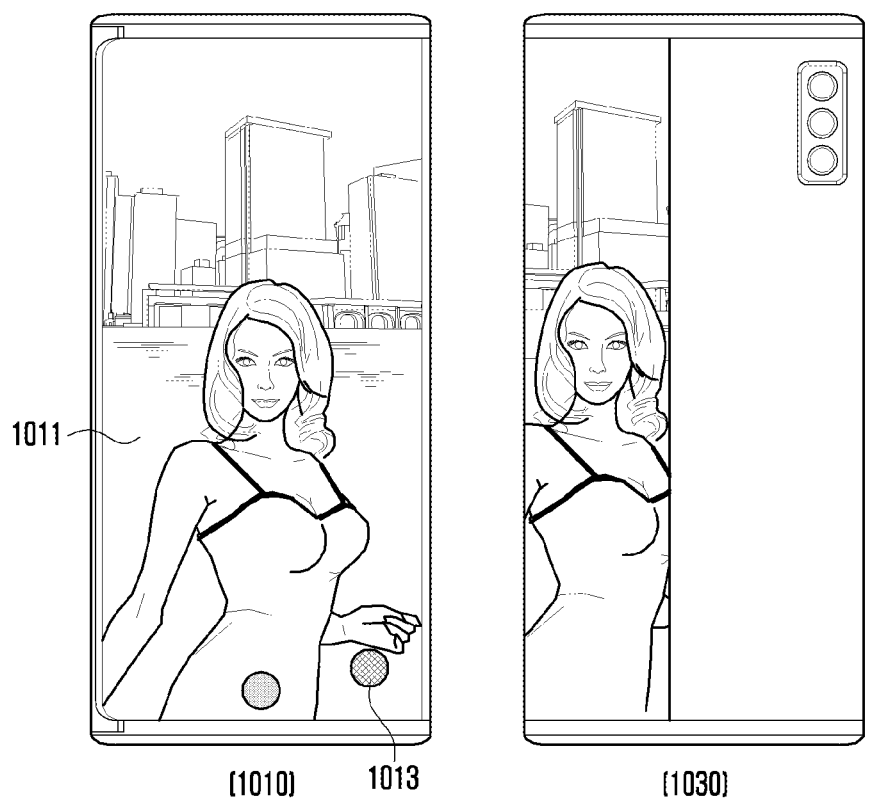
FIGS. 10A and 10B are diagrams illustrating an example in which an example electronic device according to various embodiments changes a photographing guidance area based on a user input.
Figure 10B:
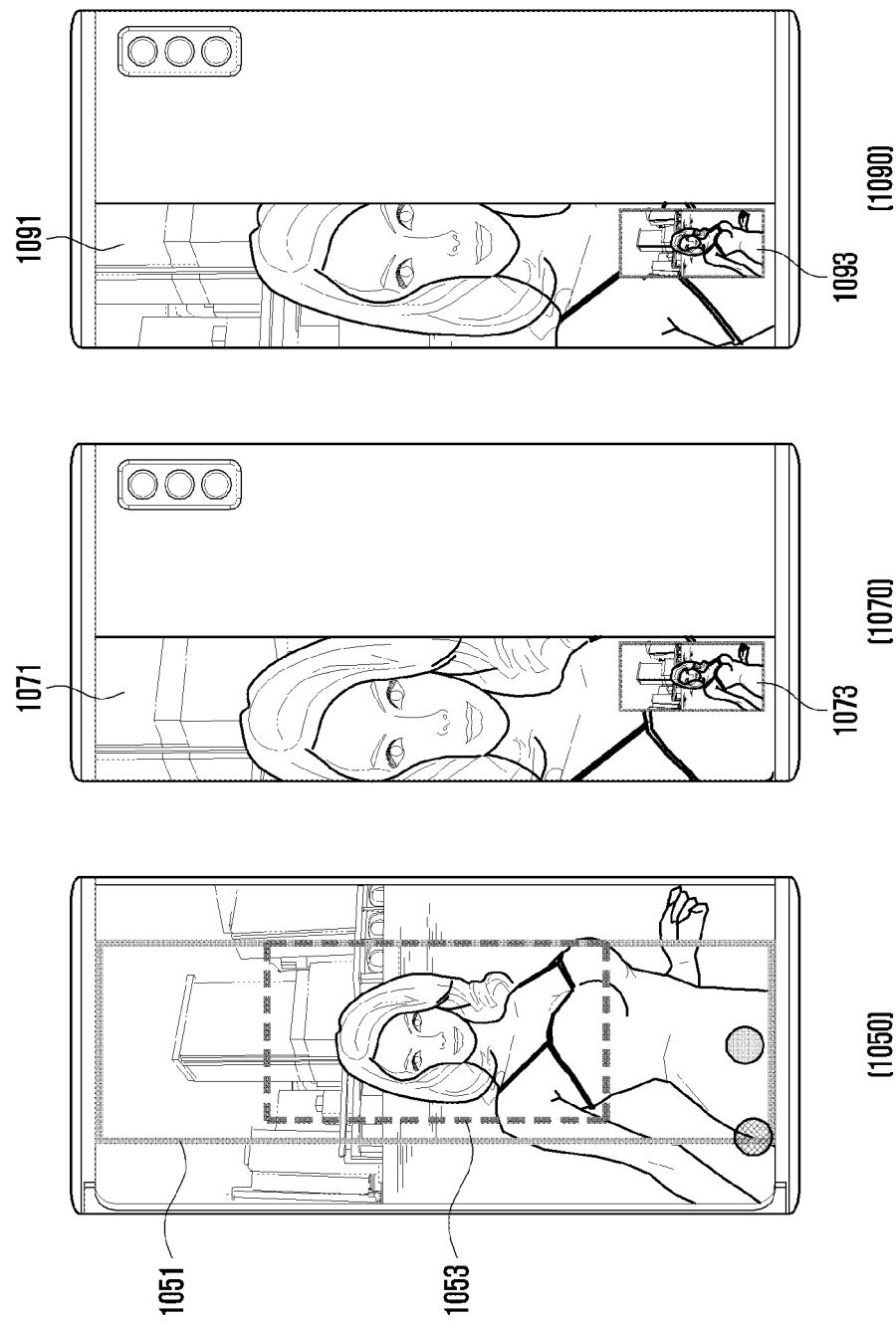

FIGS. 10A and 10B are diagrams illustrating an example in which an example electronic device according to various embodiments changes a photographing guidance area based on a user input.

Referring to FIGS. 10A and 10B, a processor (e.g., the processor 120 in FIG. 1) of an electronic device (e.g., the electronic device 101 in FIG. 1) according to various embodiments may provide a first user interface 1010 and a second user interface 1030 through a flexible display (e.g., the display module 160 of FIG. 1) while the electronic device 101 is in a closed state. The first user interface 1010 may be displayed in a first area (e.g., the first area A1 of FIG. 2A) of the display module 160, which is the front surface of the electronic device 101. The processor 120 may provide an image 1011 acquired from a camera module (e.g., the camera module 180 in FIG. 1 or the multiple camera modules 262, 263, and 264 of FIG. 2A) to the first user interface 1010 in a preview form. The second user interface 1030 may be displayed in a second area (e.g., the second area A2 of FIG. 2A) of the display module 160, which is the rear surface of the electronic device 101.

The first user interface 1010 may include a button 1013 for configuring an area to be displayed in the second area A2. When the button 1013 is selected in the first user interface 1010, the processor 120 may provide a third user interface 1050 (FIG. 10B) capable of configuring a partial area of the image 1011 as an area to be displayed in the second area A2.

The third user interface 1050 may be displayed in the first area A1 of the display module 160, which is the front surface of the electronic device 101, and may include an area configuration window 1051. The area configuration window 1051 may be superposed and displayed on the image 1011 acquired from the camera module 180. The area configuration window 1051 may move up, down, left, or right according to a user's input. Alternatively, the size of the area configuration window 1051 may be increased or reduced according to the user's input. The user may configure an area 1053 to be displayed in the second area A2 by reducing the size of the area configuration window 1051. Although not illustrated, when the area 1053 to be displayed in the second area A2 is configured, the third user interface 1050 may include an image 1071 displayed in the second area A2 on the image 1011.

A fourth user interface 1070 may be displayed in the second area A2 of the display module 160, which is the rear surface of the electronic device 101, and may include the first image 1071 corresponding to the configured area 1053. The first image 1071 may include a partial image of the image 1011, which is to be displayed in the second area A2 according to the user's selection. The first image 1071 may be a portion of the image 1011 or an image obtained by enlarging or reducing a portion of the image 1011. The fourth user interface 1070 may display a second image 1073 on the first image 1071. The second image 1073 may correspond to the image 1011.

The user may change the configured area 1053 while the fourth user interface 1070 is displayed. The processor 120 may provide a fifth user interface 1090 when the configured area 1053 is changed. The fifth user interface 1090 may be displayed in the second area A2 of the display module 160, which is the rear surface of the electronic device 101, and may include a third image 1091 corresponding to the configured area 1053. The third image 1091 may be a portion of the image 1011 and may correspond to an area different from that of the first image 1071. The fifth user interface 1090 may display a fourth image 1093 on the third image 1091. The fourth image 1093 is identical to the second image 1073, and may correspond to the image 1011.

Figure 11:
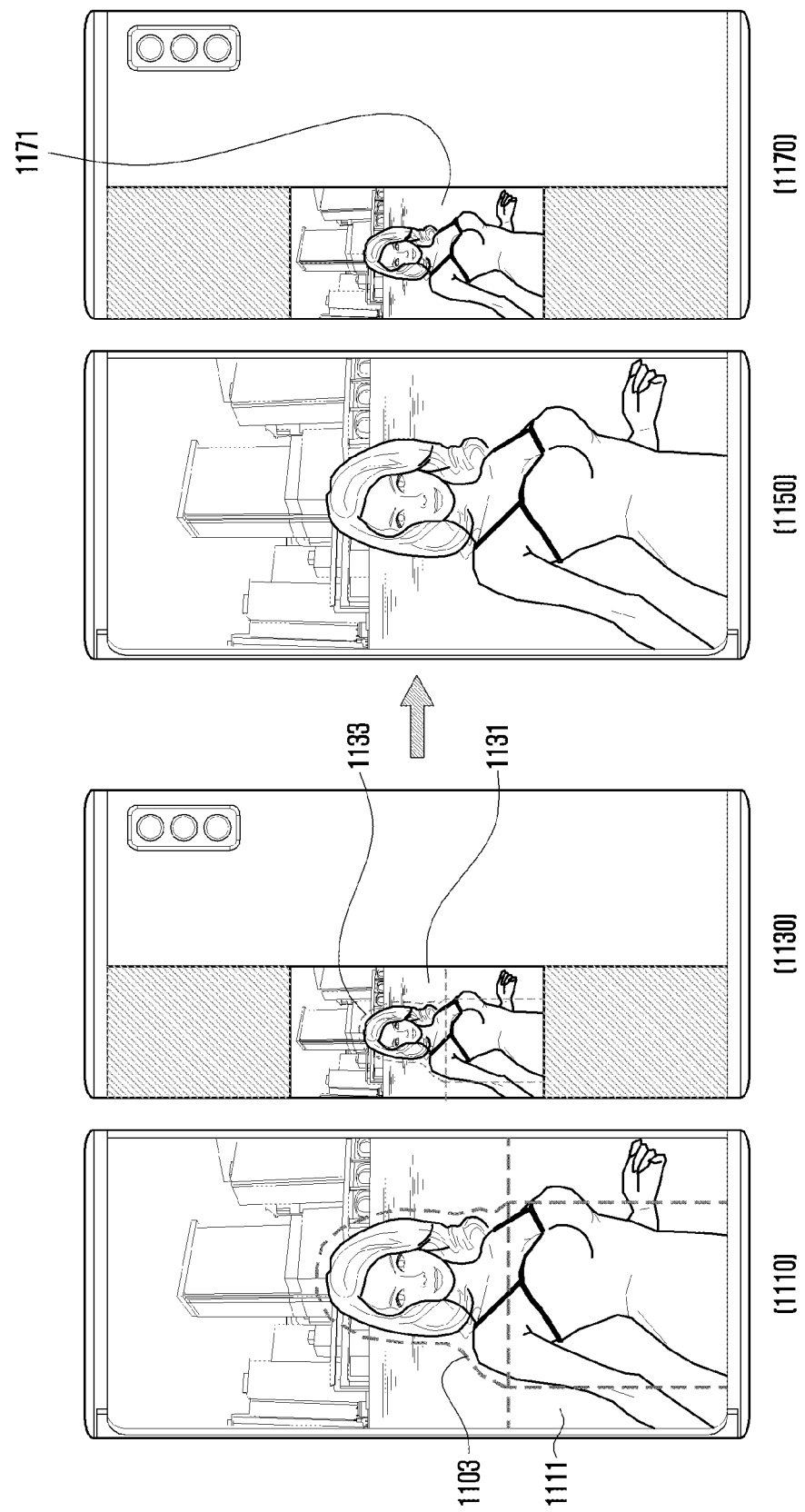
FIG. 11 is a diagram illustrating an example of providing various types of photographing guidance information by an example electronic device according to various embodiments.

FIG. 11 is a diagram illustrating an example of providing various types of photographing guidance information by an example electronic device according to various embodiments.

Referring to FIG. 11, a processor (e.g., the processor 120 in FIG. 1) of an electronic device (e.g., the electronic device 101 in FIG. 1) according to various embodiments may provide a first user interface 1110 and a second user interface 1130 through a flexible display (e.g., the display module 160 of FIG. 1) while the electronic device 101 is in a closed state. The first user interface 1110 may be displayed in a first area (e.g., the first area A1 of FIG. 2A) of the display module 160, which is the front of the electronic device 101. The processor 120 may provide a front image 1111 acquired from a camera module (e.g., the camera module 180 in FIG. 1 or the multiple camera modules 262, 263, and 264 of FIG. 2A) to the first user interface 1110 in a preview form.

The first user interface 1110 may include a suggested pose line 1103 in the front image 1111. The processor 120 may suggest a pose or a photographing position (or angle) to a subject for better photographing in conjunction with an artificial intelligence (AI) server. The processor 120 may provide the suggested pose line 1103 as first photographing guidance information. The second user interface 1130 is displayed in a second area (e.g., the second area A2 in FIG. 2A) of the display module 160, which is the rear surface of the electronic device 101, and may include a rear image 1131 corresponding to the front image 1111, and a suggested pose line 1133. The processor 120 may provide the suggested pose line 1133 as second photographing guidance information.

The processor 120 may perform image analysis to determine whether a subject is positioned on the suggested pose line 1113. When the subject is positioned within the suggested pose line 1113, the processor 120 may provide a third user interface 1150 and a fourth user interface 1170. The third user interface 1150 is displayed in the first area A1 of the display module 160, which is the front surface of the electronic device 101, and may be an interface from which the suggested pose line 1133 has been removed. The fourth user interface 1170 is displayed in the second area A2 of the display module 160, which is the rear surface of the electronic device 101, and may be an interface from which the suggested pose line 1133 has been removed.

According to various embodiments, a method for operating an electronic device (e.g., the electronic device 101 in FIG. 1) including a flexible display (e.g., the display module 160 in FIG. 1), which includes a first area (e.g., the first area A1 in FIGS. 2A and 2C) exposed to a front surface of the electronic device in a closed state of the electronic device and a second area (e.g., the second area A2 in FIGS. 2A and 2C) extending from the first area and exposed to a rear surface of the electronic device, may include driving a camera module (e.g., the camera module 180 in FIG. 1) of the electronic device based on a user input, displaying an image acquired from the camera module in the first area and the second area, providing first photographing guidance information through the first area, and providing second photographing guidance information different from the first photographing guidance information through the second area.

The providing may include analyzing the acquired image to generate the first photographing guidance information for guiding a photographer, and generating second photographing guidance information for guiding a photographing target.

The providing may include identifying a display size of the second area exposed through the rear surface of the electronic device, identifying a subject from the acquired image, and generating the second photographing guidance information based on the display size of the second area and the subject.

The providing may include determining a photographing guidance area based on the acquired image, identifying a subject from the acquired image, and generating the second photographing guidance information based on the photographing guidance area and the subject.

The providing may include identifying a distance to a subject included in the acquired image, and generating the second photographing guidance information based on at least one among a display size of the second area, the distance to the subject, or an attribute of the subject.

The providing may include determining a photographing guidance area including at least one subject when there is more than one subject included in the image, and generating the second photographing guidance information based on the photographing guidance area, a distance to the subject, and/or an attribute of the subject.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing;
   a second housing;
   a camera module including a camera;
   a flexible display comprising a first area exposed to a front surface of the electronic device in a closed state of the electronic device and a second area extending from the first area and exposed to a rear surface of the electronic device;
   a memory; and
   a processor operatively connected to the camera module, the flexible display, and the memory,
   wherein the processor is configured to:
      drive the camera module based on a user input;
      display an image acquired from the camera module in the first area and the second area; and
      provide first photographing guidance information through the first area and provide second photographing guidance information different from the first photographing guidance information through the second area.

2. The electronic device of claim 1, wherein the processor is configured to analyze the acquired image to generate the first photographing guidance information for guiding a photographer and generate the second photographing guidance information for guiding a photographing target.

3. The electronic device of claim 1, wherein the processor is configured to:
   identify a display size of the second area exposed through the rear surface of the electronic device;
   identify a subject from the acquired image; and
   generate the second photographing guidance information based on the display size of the second area and the subject.

4. The electronic device of claim 1, wherein the processor is configured to generate different types of the second photographing guidance information, based on the display size of the second area.

5. The electronic device of claim 1, wherein the processor is configured to:
   determine a photographing guidance area based on the acquired image;
   identify a subject from the acquired image; and
   generate the second photographing guidance information based on the photographing guidance area and an attribute of the subject.

6. The electronic device of claim 5, wherein the processor is configured to change the photographing guidance area, based on a user input.

7. The electronic device of claim 5, wherein the processor is configured to:
   identify a display size of the second area exposed through the rear surface of the electronic device; and
   generate the second photographing guidance information based on the display size of the second area, the photographing guidance area, and the attribute of the subject.

8. The electronic device of claim 1, wherein the processor is configured to:
   identify a distance to a subject included in the acquired image; and
   generate the second photographing guidance information based on the distance to the subject and the subject.

9. The electronic device of claim 8, wherein the processor is configured to:
   determine a photographing guidance area comprising at least one subject in a case that more than one subject is included in the image; and
   generate the second photographing guidance information based on the photographing guidance area, the distance to the subject, and an attribute of the subject.

10. The electronic device of claim 8, wherein the processor is configured to adjust, based on the distance to the subject, volume of audio provided as the second photographing guidance information.

11. The electronic device of claim 1, wherein the processor is configured to configure, based on a user input, a partial area of the image displayed in the first area as an area to be displayed in the second area.

12. The electronic device of claim 1, wherein the processor is configured to display a user interface, in which a suggested pose line is displayed in the acquired image, in the first area and the second area.

13. The electronic device of claim 1, wherein the second area is configured to:
- be exposed to the rear surface of the electronic device in a case that the second area is received in the second housing; and
- be exposed out of the second housing according to movement of the first housing and exposed to the front or rear surface of the electronic device.

14. The electronic device of claim 13, wherein the flexible display is configured such that a size of a display area exposed to the front or rear surface of the electronic device is different according to the movement of the first housing.

15. A method of operating an electronic device comprising a flexible display which comprises a first area exposed to a front surface of the electronic device in a closed state of the electronic device and a second area extending from the first area and exposed to a rear surface of the electronic device, the method comprising:
- driving a camera module, including a camera, of the electronic device based on a user input;
- displaying an image acquired from the camera module in the first area and the second area;
- providing first photographing guidance information through the first area, and providing second photographing guidance information different from the first photographing guidance information through the second area.

16. The method of claim 15, wherein the providing comprises:
- analyzing the acquired image to generate the first photographing guidance information for guiding a photographer, and generating second photographing guidance information for guiding a photographing target.

17. The method of claim 15, wherein the providing comprises:
- identifying a display size of the second area exposed through the rear surface of the electronic device;
- identifying a subject from the acquired image; and
- generating the second photographing guidance information based on the display size of the second area and the subject.

18. The method of claim 15, wherein the providing comprises:
- determining a photographing guidance area based on the acquired image;
- identifying a subject from the acquired image; and
- generating the second photographing guidance information based on the photographing guidance area and the subject.

19. The method of claim 17, wherein the providing further comprising identifying a distance to a subject included in the acquired image, and generating the second photographing guidance information based on at least one among a display size of the second area, the distance to the subject, or and an attribute of the subject.

20. The method of claim 19, wherein the providing comprises:
- determining a photographing guidance area including at least one subject when there is more than one subject included in the image, and
- generating the second photographing guidance information based on the photographing guidance area, a distance to the subject, and/or an attribute of the subject.

* * * * *